United States Patent
Pendakur

(10) Patent No.: US 6,502,126 B1
(45) Date of Patent: *Dec. 31, 2002

(54) METHOD AND APPARATUS FOR RUNNING CUSTOMIZED DATA AND/OR VIDEO CONFERENCING APPLICATIONS EMPLOYING PREPACKAGED CONFERENCE CONTROL OBJECTS UTILIZING A RUNTIME SYNCHRONIZER

(75) Inventor: Ramesh Pendakur, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,060

(22) Filed: Sep. 29, 1997

Related U.S. Application Data

(63) Continuation of application No. 08/431,108, filed on Apr. 28, 1995, now abandoned.

(51) Int. Cl.[7] ............................................. G06F 15/16
(52) U.S. Cl. ..................... 709/204; 709/206; 709/315; 709/313; 709/237
(58) Field of Search ............................... 395/200–255, 395/680, 682, 683; 709/300, 302, 309, 204, 206, 313, 310, 237

(56) References Cited

U.S. PATENT DOCUMENTS

| | | | | |
|---|---|---|---|---|
| 5,434,852 A | * | 7/1995 | La Porta et al. | 370/385 |
| 5,452,299 A | * | 9/1995 | Thessin et al. | 370/260 |
| 5,524,110 A | * | 6/1996 | Danneels et al. | 709/204 |
| 5,566,302 A | * | 10/1996 | Khalidi et al. | 709/312 |
| 5,572,582 A | * | 11/1996 | Riddle | 379/202.01 |
| 5,594,859 A | * | 1/1997 | Palmer et al. | 345/753 |
| 5,619,555 A | * | 4/1997 | Fenton et al. | 379/196 |
| 5,689,641 A | * | 11/1997 | Ludwig et al. | 709/241 |
| 5,717,863 A | * | 2/1998 | Adamson et al. | 709/204 |
| 5,724,508 A | * | 3/1998 | Harple et al. | 709/205 |
| 5,737,530 A | * | 4/1998 | Kukkal et al. | 345/755 |
| 5,754,775 A | * | 5/1998 | Adamson et al. | 370/261 |
| 5,754,776 A | * | 5/1998 | Hales et al. | 345/753 |
| 5,758,083 A | * | 5/1998 | Singh et al. | 709/223 |
| 5,794,018 A | * | 8/1998 | Vrvilo et al. | 713/400 |
| 5,802,282 A | * | 9/1998 | Hales et al. | 709/204 |
| 5,805,830 A | * | 9/1998 | Reese et al. | 345/753 |
| 5,828,838 A | * | 10/1998 | Downs et al. | 709/201 |
| 5,854,898 A | * | 12/1998 | Riddle | 709/204 |

OTHER PUBLICATIONS

Roseman, Mark et al. "Groupkit, A Groupware Toolkit for Building Real-Time Conferencing Applications", ACM. Nov. 1992.*

* cited by examiner

Primary Examiner—St. John Courtenay, III
Assistant Examiner—Lewis A. Bullock, Jr.
(74) Attorney, Agent, or Firm—Blakely, Sokoloff, Taylor & Zafman LLP

(57) ABSTRACT

An object-oriented DVC application runtime interface (RI) having a number of runtime management and channel objects is provided for assisting running of customized DVC applications incorporated with prepackaged conference control objects that facilitate accesses to conferencing services of GPPC applications. An identical copy of the DVC application RS is to be provided on each system, interposed between the DVC and the GPPC applications, to synchronize A/V rendering as well as data and file channels of the local DVC application to its remote counterpart. The runtime management and channel objects include a Runtime Manager Object, a Channel Manager Object, a pair of Control Input and Output Channel Objects, zero or more pairs of Data Input and Output Channel Objects, and zero or more pairs of File Input and Output Channel Objects for augmenting accesses having repercussion on the remote DVC application, and/or imposes proper end-to-end synchronization on the accesses, before passing the accesses onto the interposed GPPC application. In the presently preferred embodiments, the Runtime Manager Object also automatically exchanges capability information with its counterpart and disables the capabilities of the local DVC application that are unsupported by the connected remote DVC application. Lastly, both data as well as file blocks are sent and received as messages.

16 Claims, 18 Drawing Sheets

CONNECTION CONTROL OBJECT

| CUSTOM PROPERTY 74 | R/W 76 | SETTING/VALUES 78 | REMARKS |
|---|---|---|---|
| ACTION 74a | W | CONNECT<br>HANGUP<br>SHARE NOTEBOOK 78a | INITIATE A CONNECTION<br>TERMINATE A CONNECTION<br>START CONFERENCE NOTEBOOK & SHARE |
| CALLER ID 74b | R | I/D OF REMOTE PARTY 78b | AVAILABLE AFTER CONNECTION IS MADE |
| CONNECTION ADDRESS 74c | R/W | PHONE # OR LAN ADDR 78c | |
| CONNECTION TYPE 74d | R/W | ISDN, IPX, NET BIOS<br>TCP/IP 78d | |
| IS CALLER 74e | R | TRUE/FALSE 78e | TRUE = CALLER, FALSE = CALLEE |
| STATUS 74f | R | READY<br>CONNECTING<br>CONNECTED<br>DISCONNECTING<br>CONNECT REQUEST 78f | READY TO ESTABLISH CONNECTION<br>CONNECTION IN PROGRESS<br>CONNECTION ESTABLISHED<br>DISCONNECTION IN PROGRESS<br>CONNECTION REQUEST IN PROGRESS |
| USER ID 74g | R | ID OF LOCAL PARTY 78g | |

LOCAL A/V CONTROL OBJECT

| CUSTOM PROPERTY 80 | R/W 82 | SETTING/VALUES 84 | REMARKS |
|---|---|---|---|
| ACTION 80a | W | PLAY<br>PAUSE (AUDIO/VIDEO)<br>SNAPSHOT<br>ZOOM 84a | PLAY AUDIO & VIDEO<br>PAUSE AUDIO AND/OR VIDEO<br>TAKE A SNAPSHOT<br>ZOOM LOCAL WINDOW |
| BRIGHTNESS 80b | R/W | 0 - 100 84b | |
| CONTRAST 80c | R/W | 0 - 100 84c | |
| SATURATION 80d | R/W | 0 - 100 84d | |
| SIZE 80e | R/W | NORMAL, LARGE 84e | NORMAL = 160 x 120 PIECES<br>LARGE = 320 x 240 PIECES |
| SNAPSHOT DEST 80f | R/W | FILE, CLIPBOARD 84f | |
| SNAPSHOT FILE 80g | R/W | FILENAME 84g | |
| SNAPSHOT FORMAT 80h | R/W | DIB OR BMP 84h | |
| STATUS 80i | R | PLAY<br>PAUSE (AUDIO/VIDEO) 84i | PLAY AUDIO AND VIDEO<br>PAUSE AUDIO AND/OR VIDEO |
| TINT 80j | R/W | 0 - 100 84j | |
| ZOOM 80k | R/W | OUT/IN 84k | |
| ZOOM STATE 80l | R | ZOOM OUT/ZOOM IN 84l | |

FIG. 9

REMOTE A/V CONTROL OBJECT

| CUSTOM PROPERTY 86 | R/W 88 | SETTING/VALUES 90 | REMARKS |
|---|---|---|---|
| ACTION 86a | W | SNAPSHOT ZOOM | TAKE A SNAPSHOT 90a ZOOM REMOTE VIDEO |
| BRIGHTNESS 86b | R/W | 0 - 100 90b | |
| CONTRAST 86c | R/W | 0 - 100 90c | |
| OPEN AUDIO 86d | R/W | ON/OFF 90d | ON = SPEAKER OFF = HEADSET |
| SATURATION 86e | R/W | 0 - 100 90e | |
| SIZE 86f | R/W | NORMAL, LARGE 90f | NORMAL = 160 x 120 PIECES LARGE = 320 x 240 PIECES |
| SNAPSHOT DEST 86g | R/W | FILE, CLIPBOARD 90g | |
| SNAPSHOT FILE 86h | R/W | FILENAME 90h | |
| SNAPSHOT FORMAT 86i | R/W | DIB, BMP 90i | |
| STATUS 86j | R | PLAY PAUSE (AUDIO/VIDEO) 90j | PLAY AUDIO AND VIDEO PAUSE AUDIO AND/OR VIDEO |
| TINT 86k | R/W | 0 - 100 90k | |
| ZOOM 86l | R/W | OUT/IN 90l | |
| ZOOM STATE 86m | R | ZOOM OUT/ZOOM IN 90m | |

DATA CHANNEL CONTROL OBJECT

| CUSTOM PROPERTY 92 | R/W 94 | SETTING/VALUES 96 | REMARKS |
|---|---|---|---|
| ACTION 92a | W | OPEN<br>CLOSE<br>ABORT 96a | OPEN A DATA CHANNEL<br>CLOSE A DATA CHANNEL<br>ABORT A DATA CHANNEL |
| PRIORITY 92b | R/W | LOW/MEDIUM/HIGH 96b | RELATIVE SPEED OF DATA TRANSMISSION |
| STATUS 92c | R/W | CLOSED/READY<br>SENDING/RECEIVING 96c | DATA CHANNEL CLOSED/READY<br>DATA CHANNEL SENDING/RECEIVING DATA |

FIG. 10

FILE CHANNEL CONTROL OBJECT

| CUSTOM PROPERTY 98 | R/W 100 | SETTING/VALUES 102 | REMARKS |
|---|---|---|---|
| ACTION 98a | W | OPEN<br>CLOSE<br>SEND<br>ABORT 102a | OPEN A DATA CHANNEL<br>CLOSE A DATA CHANNEL<br>SEND A FILE<br>ABORT A FILE TRANSFER |
| OVERWRITE 98b | R/W | TRUE/FALSE 102b | TRUE = YES, FALSE = NO |
| PRIORITY 98c | R/W | LOW/MEDIUM/HIGH 102c | RELATIVE SPEED OF DATA TRANSMISSION |
| RECEIVE FILE NAME 98d | R/W | FILE NAME 102d | |
| SEND FILE NAME 98e | R/W | FILE NAME 102e | |
| STATUS 98f | R | CLOSED/READY<br>SENDING/RECEIVING 102f | FILE CHANNEL CLOSED/READY<br>FILE CHANNEL SENDING/RECEIVING FILE |

FIG. 11

| CONTROL OBJECT | CUSTOM EVENTS |
|---|---|
| CONNECT CONTROL | CONNECT<br>CONNECT FAILURE<br>CONNECT PROGRESS<br>CONNECT REQUEST<br>DISCONNECT |
| LOCAL VIDEO CONTROL<br>AND<br>REMOTE VIDEO CONTROL | CONNECT<br>DISCONNECT<br>ZOOM CHANGED |
| DATA CHANNEL CONTROL<br>AND<br>FILE CHANNEL CONTROL | CHANNEL CLOSE<br>CHANNEL OPEN<br>DONE RECEIVING<br>DONE SENDING<br>RECEIVE PROGRESS<br>RECEIVE STARTED<br>SEND PROGRESS<br>SEND STARTED<br>TRANSFER ABORTED |

*FIG. 12*

DATA CHANNEL CONTROL OBJECT

| CUSTOM FUNCTIONS 108 | PARAMETERS 110 | REMARKS 112 |
|---|---|---|
| DATA CHANNEL SEND 108a | SND_PTR<br>SND_Length 110a | START OF SOURCE BUFFER<br>LENGTH OF DATA 112a |
| DATA CHANNEL SEND 108b | REC_PTR<br>REC_Length 110b | START OF DESTINATION BUFFER<br>LENGTH OF DATA 112b |

| CONTROL OBJECTS | SUPPORT | OBJ_ID |
|---|---|---|
| CONNECT | Y | ID0 |
| LOCAL VIDEO | Y/N | ID1 |
| REMOTE VIDEO | Y/N | ID2 |
| DATA CHANNEL | | |
| AAA | Y/N | ID3 |
| BBB | Y/N | ID4 |
| FILE CHANNEL | | |
| XXX | Y/N | ID5 |
| YYY | Y/N | ID6 |

| CONTROL OBJECTS | TYPE | PHYSICAL CHANNELS |
|---|---|---|
| AAA | DATA | DC0 |
| BBB | DATA | DC1 |
| XXX | FILE | FC0 |
| YYY | FILE | FC1 |

*FIG. 17b*

METHOD AND APPARATUS FOR RUNNING CUSTOMIZED DATA AND/OR VIDEO CONFERENCING APPLICATIONS EMPLOYING PREPACKAGED CONFERENCE CONTROL OBJECTS UTILIZING A RUNTIME SYNCHRONIZER

This is a Continuation application of application Ser. No. 08/431,108, filed Apr. 28, 1995 now abandoned.

BACKGROUND OF THE INVENTION

1. Field of the Invention

The present invention relates to the field of data and/or video conferencing (DVC) applications. More specifically, the present invention relates to the development and running of these applications.

2. Background Information

As advances in telecommunication and computing technology continue to bring forth more powerful and yet affordable computer conferencing systems, it has become increasingly viable to apply the technology of DVC to a wide range of business problems. For example, the technology can be applied to allow a person in the process of relocating to a new geographic area to preview homes for sale in the new area, under the guidance of a real estate marketing representative in the new area, while the person is still in the old area. As a further example, the technology can also be applied to allow a west coast investor to remotely review the performance data of a number of financial instruments with his/her financial adviser in New York.

Conventional approaches would develop these DVC applications using any number of well known high level programming languages such as COBOL and C, and/or assembly language, employing various software development techniques such as top down design and data flow analysis. However, it will be costly if each of these DVC applications has to provide their own conferencing services, such as connection management functions, conference management functions and audio and video (A/V) services.

Since a general purpose personal conference (GPPC) application is typically incorporated with these conferencing services, it would be a lot more cost effective if DVC applications can be developed and run in a manner allowing them to exploit the conferencing services of a GPPC application, leaving substantially only the special user interfaces tailored for the special customer sets, and the companion logic to be developed.

Additionally, it is further desirable to allow DVC applications to be independently developed under this more cost effective approach, and yet they can cooperate with each other at runtime, even when the independent development led to DVC applications having different levels of capabilities, such as different number of data and file channels supported for performing data and file transfers.

As will be disclosed in more detail below, the methods and apparatus of the present invention achieve these and other desirable results.

SUMMARY OF THE INVENTION

An object-oriented DVC application runtime synchronizer (RS) having a number of runtime management and channel objects is provided for assisting running of customized DVC applications incorporated with prepackaged conference control objects that facilitate accesses to conferencing services of GPPC applications. An identical copy of the DVC application RS is to be provided on each system, interposed between the DVC and the GPPC applications, to synchronize A/V rendering as well as data and file channels of the local DVC application to its remote counterpart, thereby relieving prepackaged conference control objects incorporated in the customized DVC applications from having to provide the applicable synchronization and yet without imposing the responsibilities on the customized DVC applications.

The prepackaged conference control objects are designed to complement the interposing DVC application RS, routing all GPPC application conference service accesses that have repercussion on the remote DVC application through the DVC application RS, which in turn, augments the accesses and/or imposes proper end-to-end synchronization on the accesses, before passing the accesses onto the interposed GPPC application.

The runtime management and channel objects of the DVC application RS of the present invention include a Runtime Manager Object, a Channel Manager Object, a pair of Control Input and Output Channel Objects, zero or more pairs of Data Input and Output Channel Objects, and zero or more pairs of File Input and Output Channel Objects. Both the Runtime and Channel Manager Objects are created at installation time, whereas the Control Input and Output Channel Objects are created at connect time, and the Data and File Input and Output Channel Objects are created on an as needed basis.

The Runtime Manager Object is used to receive all accesses having repercussion on the remote DVC application from the prepackaged conference control objects, augment them with additional accesses to send control messages to the connected remote DVC application, and/or reroute them to ensure data/file blocks being transferred are delivered to the proper data/file channels of the connected remote DVC application, as appropriate.

The Channel Manager Object is used to manage the routing of the additional accesses for sending control messages as well as the re-routing of data and file block transfers. The Channel Manager Object creates the Control Input and Output Channel Objects at connect time, maintains a mapping of the data and file channels to the Data and File Input and Output Channel Objects, and creates the appropriate Data and File Input and Output Channel Objects when their corresponding data and file channels are requested to be open.

The Control Input and Output Channel Objects are used to facilitate the routing of the additional accesses for sending control messages, whereas the Data and File Input and Output Channel Objects are used to facilitate the rerouting of the accesses for data and file block transfers.

Additionally, under the presently preferred embodiments, the two DVC applications may have different level of capabilities, including different number of data and/or file channels. At connect time, the Runtime Manager Object automatically exchanges these information with its counterpart and disables the capabilities of the local DVC application that are unsupported by the connected remote DVC application.

Both data as well as file blocks are sent and received as messages. In one embodiment, each message comprises a message type, message parameters, a sequence number (for multi-block data/file transfers), a buffer/data size and the buffer/data itself. Under this embodiment, the buffer/data of the capability exchange control message comprises the number of DVC application conference control objects incorporated, and the object type and object identification of each instance of a conference control object incorporated.

BRIEF DESCRIPTION OF DRAWINGS

The present invention will be described by way of exemplary embodiments, but not limitations, illustrated in the accompanying drawings in which like references denote similar elements, and in which:

FIGS. 7–11 illustrate custom properties for one embodiment of the control objects of FIG. 6;

FIG. 12 illustrates custom events for one embodiment of the control objects of FIG. 6;

FIG. 13 illustrates custom functions for one embodiment of the control objects of FIG. 6;

FIGS. 17a–17b illustrate various essential control data maintained by the runtime management objects of FIG. 15.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
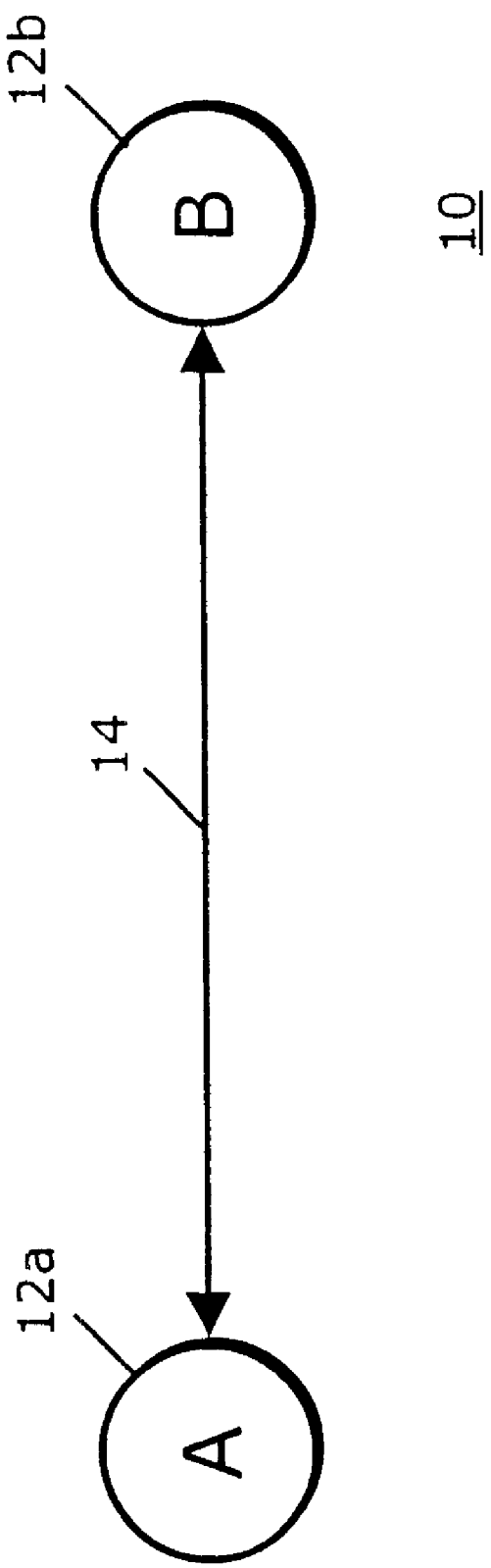
FIGS. 1 illustrates a typical point-to-point DVC system incorporating the teachings of the present invention.

Referring now to FIG. 1, an exemplary point-to-point DVC system incorporated with the teachings of the present invention is illustrated. Point-to-point DVC system 10 comprises conferencing computers A & B 12a and 12b connected to each other in a peer-to-peer manner, via either a LAN, POTS, ISDN or the like 14. Computer A 12a and Computer B 12b are joined together in conference when one of the two computers 12a or 12b call the other.

Figure 2:
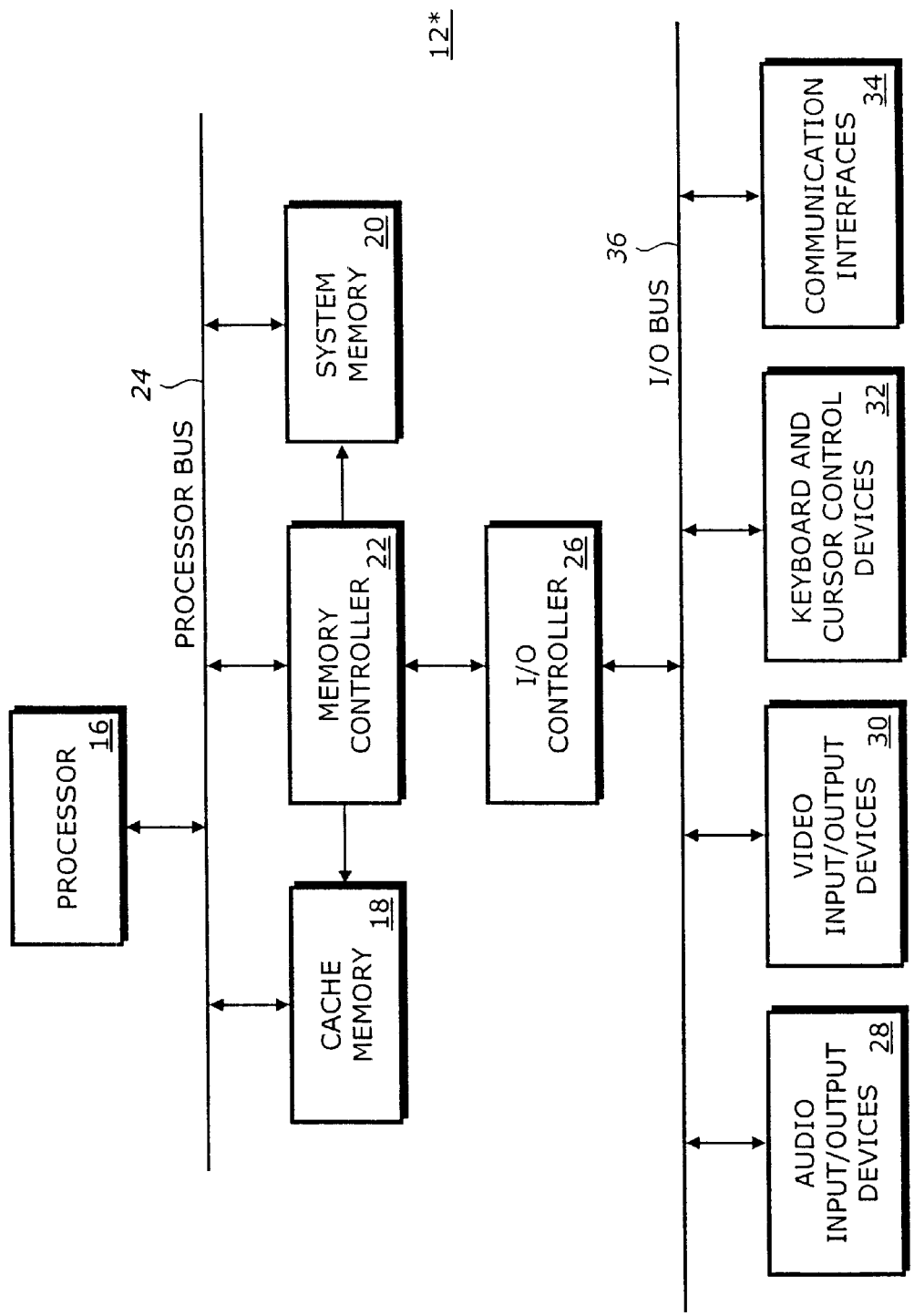
FIG. 2 illustrates the essential hardware elements of conferencing Computer A/B of FIG. 1.

FIG. 2 illustrates the essential hardware elements of Computer A/B 12*. Computer A/B 12* comprises processor 16, cache memory 18, system memory 20, memory controller 22 and processor bus 24 coupled to each other as shown. Additionally, computer A/B 12* further comprises input/output (I/O) controller 26, audio I/O devices 28, video I/O devices 30, keyboard and cursor control devices 32, communication interface 36, and I/O bus 36 coupled to each other and the earlier described elements as shown. Audio I/O devices 28 include a microphone, speakers/headphones, an audio add-on card and its driver(s), whereas video I/O devices 30 include a video display, a video camera, a video capture add-on card and its driver(s). Network interface 34 include circuitry and/or driver software in support of the physical aspects of the peer-to-peer connection, including a reliable data link manager for reliably transferring data. Computer A/B 12* is intended to represent a broad range of high performance microprocessor based computer systems including but not limited to i486 or Pentium® processors based computers. i486 and Pentium are registered trademarks of Intel Corp., the assignee of the present invention.

Figure 3:
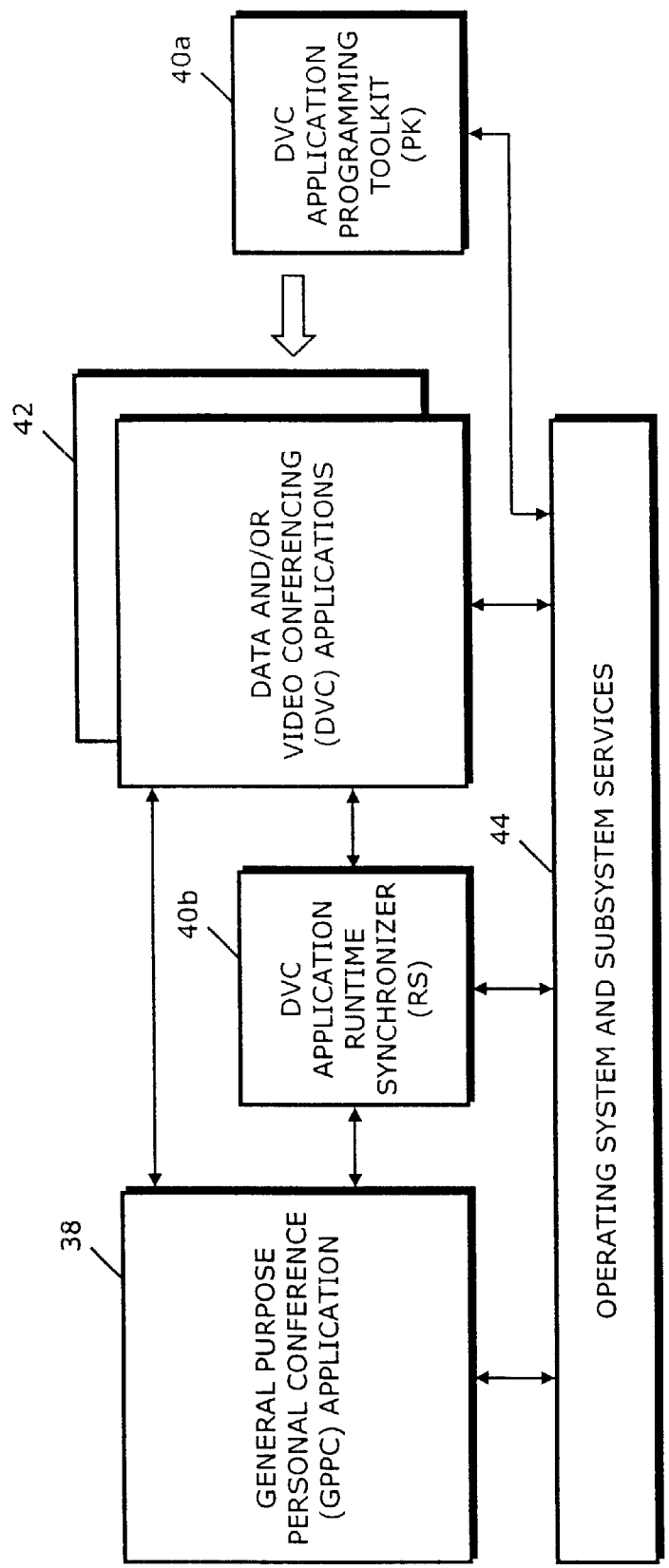
FIG. 3 illustrates the essential software elements of conferencing Computer A/B of FIG. 1.

FIG. 3 illustrates the essential software elements of Computer A/B 12* in further detail. As shown, each computer 12* comprises a number of DVC applications 42. More importantly, each computer 12* comprises DVC application programming toolkit (PK) 40a and DVC application runtime synchronizer (RS) 40b of the present invention. As will be described in more detail below, DVC application PK 40a includes a number of control objects, whereas DVC application RS 40b includes a number of runtime management and channel objects. Additionally, each computer 12* comprises an operating system 44 and a GPPC application 38.

DVC applications 42 are intended to represent a wide range of business applications including but not limited to the examples discussed earlier in the background section. DVC applications 42 are developed using control objects of the DVC application PK 40a. In other words, DVC applications 42 include instances of these control objects. During runtime, these control object instances facilitate accesses to the conference management services of GPPC application 38 by the respective DVC applications 42, thereby alleviating the DVC applications 42 from having to provide their own conferencing services and achieving the desired more cost effective approach to developing and running DVC applications 42. As will be obvious from the description to follow, DVC applications 42 may be developed independently, and therefore may have different levels of data and/or video capabilities, including different number of data and/or file channels for performing data and/or file transfers.

DVC application RS 40b is used to manage runtime interactions between a local and a remote DVC application 42, including control communication, A/V exchanges, and data/file transfers between the two independent DVC applications 42, thereby relieving the control objects from having to provide the appropriate A/V rendering as well as data/file channel synchronization, and yet without burdening the DVC application 42 with the responsibilities. The runtime management and channel objects of DVC application RS 40b complement the control object instances in facilitating runtime accesses to the conference management services of GPPC application 38 by a local DVC application 42 for those accesses made for the purpose of interacting with a remote DVC application 42.

Operating system 44 is intended to represent the operating system kernel as well as related extensions and subsystems. Operating system 44 provide traditional operating system services such as memory allocation and scheduling, which are well known in the art. Operating system 44 also provides communication device drivers for physically sending and receiving data as well as A/V signals through communication interfaces 34. Preferably, the "related extensions" of operating system 44 also provide multi-media device drivers for receiving A/V signals from the A/V input devices 28 and 30 as well as rendering audio and video on the A/V output devices 28 and 30. Preferably, the "related subsystems" of operation system 44 also provide modern object-oriented application environment support including messaging services, event notification, and graphical end user interface presentation. GPPC application 38 is intended to represent a number of the point-to-point personal conferencing applications known in the art, including but not limited to the ProShare™ Conferencing Product manufactured by Intel Corp., of Santa Clara, Calif., the assignee of the present invention. In particular, GPPC application 38 is incorporated with "internal" conference management services including connection management functions, and extended A/V services beyond the basic A/V services offered by operation system 44.

Figure 4:
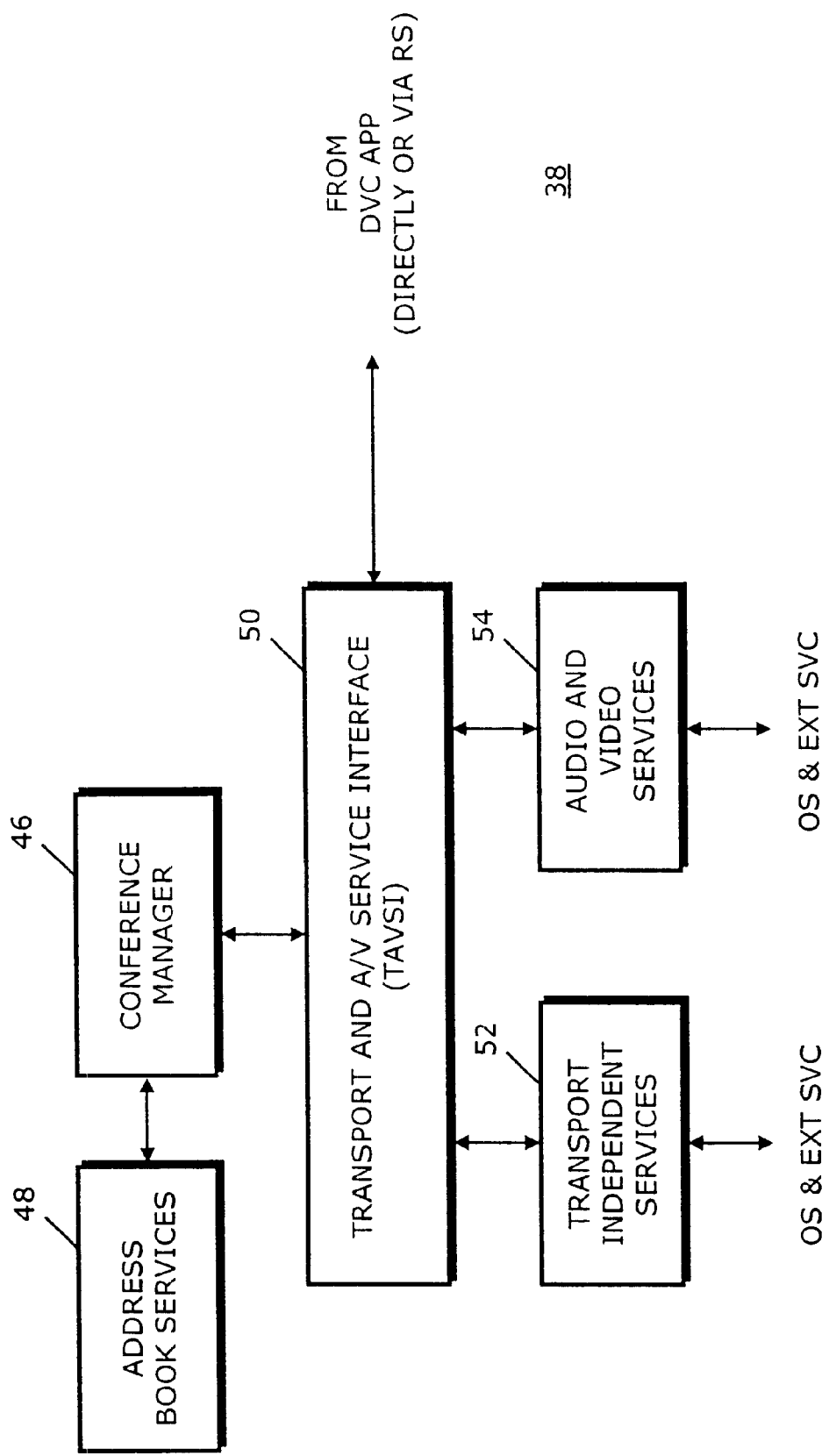
FIG. 4 illustrates the GPPC application of FIG. 3 in further detail.

FIG. 4 illustrates one embodiment of GPPC application 38 in further detail. As shown, for this embodiment, GPPC application 38 comprises conference manager 46 and address book services 48. Furthermore, GPPC application 38 comprises transport independent services 52, extended A/V services 54, and an "integrated" interface 50 to these services 52 and 54. Conference manager 46 provides a set of services that allows several conferencing applications to share a common transport independent interface connection. Address book services 48 provide services related to managing connection addresses for conference participants. Transport independent services 52 provide connection services on multiple transport media and multiple connections. A/V services 54 provide sampling, digitization, compression/decompression of audio signals exchanged between the two computers 12a–12b over a full-duplex audio connection, as well as capture and playback services for video streams including interfacing with the proper CODEC to compress and decompress the video signals. Integrated interface 50 provides abstraction of these transport and A/V services, enabling the serviced application to perform call management, data and/or file channel management, and A/V streams management. These and other related services are known in the art, and therefore will not be described in further detail.

The above described control object instances incorporated in DVC applications 42 (directly or in conjunction with the runtime management objects of DVC application RS 40b) facilitate accesses to the connection management functions as well as A/V services of GPPC application 38 through integrated interface 50. While for ease of explanation, GPPC application 38 is illustrated with all the relevant transport and A/V services abstracted at the integrated interface 38 level, it will be appreciated by those skilled in the art, the present invention may be practiced with the incorporated control object instances of DVC application 42 and runtime management object of DVC application RS 40b facilitating accesses through direct interactions with the transport independent services 52 and A/V services 54, partially or totally by-passing interface 50.

Figure 5:
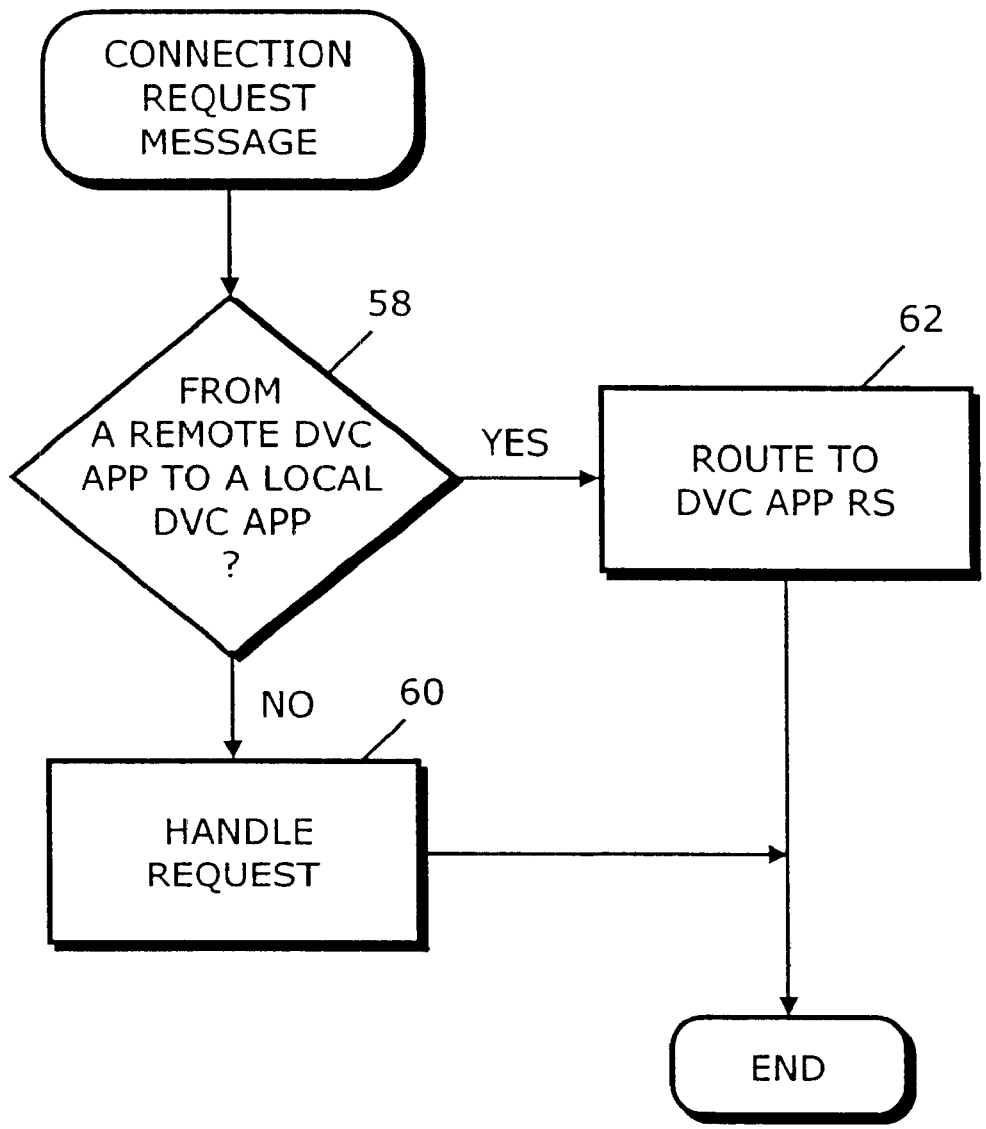
FIG. 5 illustrates a particular relevant aspect of the transport and audio/video service interface of FIG. 3 in further detail.

Before proceeding to describe DVC application PK 40a and DVC application RS 40b in further detail, we now refer briefly to FIG. 5, wherein an operational modification to conference manager 46 such that it cooperates also with DVC application RS 40b is shown. As illustrated, conference manager 46 is modified such that it will handle any connection request received from a remote computer 12* in one of two ways. More specifically, a connection request will be handled by conference manager 46, step 60, if it is determined at step 58, the request is not a request originated from a remote DVC application for a local DVC application. However, a connection request will be routed to DVC application RS 40b, step 62, if it is determined at step 58, the request is a request originated from a remote DVC application for a local DVC application.

It should also be noted that while for ease of explanation Computer A and B 12a and 12b are both described as having DVC application PK 40a and DVC application RS 40b, those skilled in the art would appreciate that DVC application PK 40a and DVC application RS 40b of the present invention may be practiced separately on different systems. Furthermore, DVC application PK 40a may be practiced on a system without all the hardware elements described earlier, such as A/V devices 28 and 30 and communication interface 34.

Figure 6:
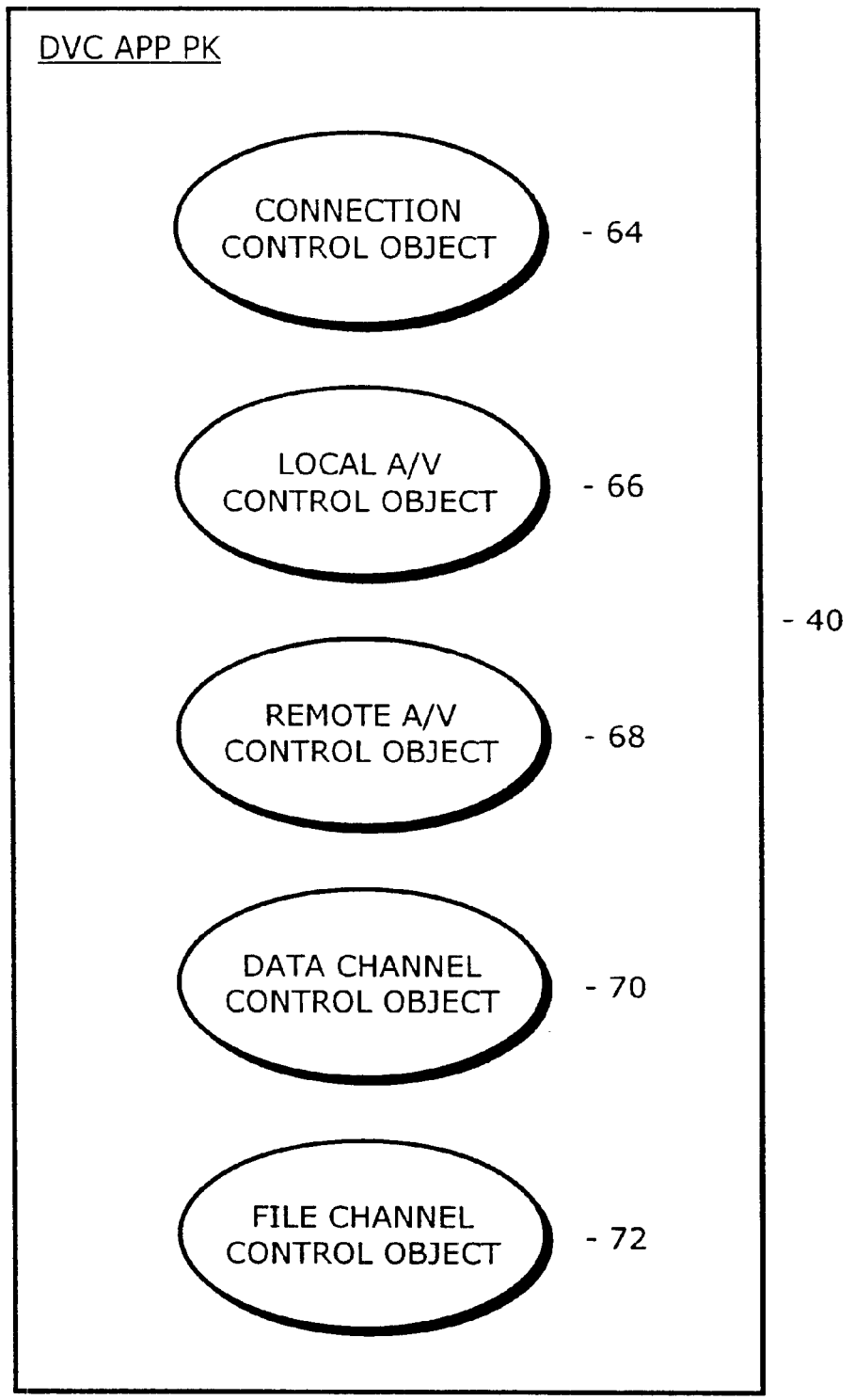
FIG. 6 illustrates the DVC application development toolkit of the present invention in further detail.

We now proceed first to describe DVC application PK 40a in further detail, with references to FIGS. 6–14. Referring first to FIG. 6, wherein the presently preferred embodiment is illustrated. As shown, under the presently preferred embodiment, DVC application PK 40a is object-oriented. DVC application PK 40a includes a Connection Control Object 64, a Local A/V Control Object 66, a Remote A/V Control Object 68, a Data Channel Control Object 70 and a File Channel Control Object 72. In other words, the various control data, i.e. connection control data, local A/V control data etc., are "encapsulated", and the object users, i.e. the rest of DVC applications 42 manipulate the control data by invoking the associated methods, as is known in the art of object-oriented programming.

Connection Control Object 64 (more specifically, an instance thereof) is used by local DVC application 42 to exploit the connection management functions of local GPPC application 38 to manage its connection to remote DVC application 42. Local A/V Control Object 66 (more specifically, an instance thereof) is used by local DVC application 42 to exploit the extended A/V services 54 of local GPPC application 38 to manage the capturing of local A/V, their local rendering, and provision to remote DVC application 42. Similarly, Remote A/V Control Object 68 (more specifically, an instance thereof) is used by local DVC application 42 to exploit the extended A/V services of local GPPC application 39 to manage the receipt of remote A/V signals from remote DVC application 42, and their local rendering.

Data Channel Control Object 70 (more specifically, instances thereof) is used by local DVC application 42 to exploit the data management functions of local GPPC application 38 to manage its data channels and transfer data to and from remote DVC application 42. In like manner, File Channel Control Object 72 (more specifically, instance thereof) is used by local DVC application 42 to exploit the data management functions of local GPPC application 38 to manage its file channels and transfer files to remote DVC application 42.

Each DVC application 42 must include an instance of Connection Control Object 64. Additionally, each DVC application 42 may include one instance each of Local A/V Control Object 66 and Remote A/V Control Object 68. Furthermore, each DVC application 42 may include one or more instance each of Data Channel Control Object 70 and File Channel Control Object 72. In other words, a DVC application 42 may have multiple data channels as well as multiple file channels, making it easier for the DVC application 42 to manage data and file transfer. However, because transmission bandwidth is limited, only a subset of these channels may be open at any one point in time. In one embodiment, a DVC application 42 may have up to two data channels and two file channels, with two channels of either kind open at any one point in time.

In the presently preferred embodiments, these control objects 64–72 are implemented using Visual Basic and Visual C++, manufactured by Microsoft Corp., of Redmond, Wash. In addition to the standard properties and events, each control object 64–72 includes a number of custom properties for qualifying the kind of functions/services to be facilitated, and a number of events for properly notifying the local DVC application 42. The Data Channel Control Object 70 further includes a Data Channel Send as well as a Data Channel Receive function for sending and receiving data. The standard properties and events will not be further described. For further information, refer to the various product literature's.

FIG. 7–11 illustrate the key custom properties and their legal values including the meaning of the legal values, for the various conference control objects 64–72. As shown in FIG. 7, Connection Control Object's 64 key custom properties 74 include Action 74a, CallerId 74b, ConnectionAddress 74c, ConnectionType 74d, IsCaller 74e, Status 74f and UserId 74g. Whether any of these key properties 74a–74g are writable or read only or both are illustrated in the adjacent column.

Action 76 may be set to Connect, HangUp, or ShareNotebook. Action 76 may be set to Connect only after ConnectionAddress 74c and ConnectionType 74d have been set accordingly as described below. Whenever Action 76 is set to Connect, connection management object 64 initiates a connection request to a remote DVC application 42 on behalf of a local DVC application 42. Whenever Action 76 is set to HangUp, connection management object 64 initiates a connection disconnect to a remote DVC application 42 on behalf of a local DVC application 42. Finally, whenever Action 76 is set to ShareNotebook, connection management object 64 causes the Conference Notebook of the local GPPC application 38 to be shared with the remote GPPC application 38.

CallerId 74b is set to the identification of the remote party. CallerID 74b is set after the connection is established, regardless whether the local DVC application 42 initiated the connection request or received the connection request from a remote DVC application 42. ConnectionAddress 74c is set to the phone number or the LAN address of the remote computer 12*. ConnectionType 74d is set to the type of connection to be established, e.g. ISDN, IPX, NetBIOS, TCP/IP etc. IsCaller 74e is set to either True or False denoting whether the local computer 12* is the computer who initiated the call. Skipping to UserId 74g, it is set to the identification of the local party. Userid 74g is provided to the remote DVC application 42 when making the connection.

Finally, going back to Status 74f, it is set to the current status of the "connection", i.e. Ready meaning ready to make a new connection, Connecting meaning connection is in progress, Connected meaning connection has been established, Disconnecting meaning disconnection is in progress, and ConnectRequest meaning a connection is requested of local DVC application 42 by remote DVC application 42.

As shown in FIGS. 8 and 9, both Local and Remote A/V Control Object's 66 and 68 key custom properties include Action 80a and 86a, Brightness 80b and 86b, Contrast 80c and 86c, Saturation 80d and 86e, Size 80e and 86f, SnapshotDestination 80f and 86g, SnapshotFilename 80g and 86h, SnapshotFormat 80h and 80i, Status 80i and 86j, Zoom 80k and 86l, and ZoomState 80l and 86m. Additionally, Local A/V Control Object's 66 key custom properties further include Tint 80j, whereas Remote A/V Control Object's 68 key custom properties further include OpenAudio 86d and Volume 86k.

Action 80a and 86a may be set to Snapshot, or Zoom. Additionally Action 80a (Local A/V Control Object 66) may also be set to Play or Pause with or without further qualification of Audio or Video. Whenever Action 80a is set to Play, Local A/V Control Object 66 causes local A/V to be captured, rendered locally, and provided to remote DVC application 42. Whenever Action 80a is set to Pause, Local/Remote A/V Control Object 66/68 will cause local A/V capturing, their rendering as well as provision to remote DVC application 42 to be paused accordingly. If no further qualification is provided, both capturing, rendering and providing of audio and video will be caused to be paused. If audio is further specified, only capturing, rendering, and providing of audio will be caused to be paused. Similarly, if video is further specified, only, capturing, rendering, and providing of video will be caused to be paused.

Brightness 80b and 86b, Contrast 80c and 86c, and Saturation 80d and 86e may be set to an integer between a predetermined range such as 0–100, denoting the relative brightness, contrast and saturation of the local and remote video to be rendered. Similarly, Tint 80j and Volume 86k may be set to an integer between a predetermined range such as 0–100, denoting the relative tint of the local video and the relative volume of the remote audio to be rendered.

OpenAudio 86d may be set to either On or Off denoting whether remote audio signals are to be rendered through a Speaker or a Headset (audio output devices 28). Size 80e and 86f may be set to either Normal or Large denoting a video window size of 160×120 pixels and 320×240 pixels respectively. Snapshot destination 80f and 86g may be set to File or Clipboard. Whenever File is specified, the associated SnapshotFile 80g/86h is set to the file name, and the associated SnapshotFormat 80h/86i is set to the snapshot image format standard, such as DIB or BMP. Zoom 80k and 86l may be set to either out or in denoting zoom out or zoom in of the local/remote video input device 30. ZoomState 80l and 86m are set to the respective current status of the zoom state, i.e. zoom out or zoom in.

Lastly, Status 80i and 86j may be set to the current status of A/V signal rendering, i.e. Play if the A/V signals are being rendered or Pause if either audio or video signals are not being rendered. If only either audio or video is paused, the Pause status is further qualified to denote whether audio or video is paused.

As shown in FIGS. 10 and 11, both Data Channel and File Channel Control Objects' 70 and 72 key custom properties 92 and 98 include Action 92a and 98a, Priority 92b and 98c, and Status 92c and 98f. Additionally, as shown in FIG. 11, File Channel Control Object's 72 key custom properties 98 further include Overwrite 98b, ReceiveFileName 98d and SendFileName 98e.

Action 92a and 98a may be set to Open, Close or Abort. Whenever Action 92a/98a is set to Open, Data/File Channel Control Object 70/72 causes a data/file channel to be open. Whenever Action 92b/98b is set to Close, Data/File Channel Control Object 70/72 causes a data/file channel to be closed. Whenever Action 92a/98a is set to Abort, Data/File Channel Control Object 70/72 causes a data/file transfer to be aborted. Additionally, Action 98a may also be set to Send. Whenever Action 98a is set to Send, File Channel Control Object 72 causes a file to be transferred.

Priority 92b and 98c may be set to Low, Medium or High denoting the relative data transfer speed to be employed for transferring data. A data transfer involving a Data/File Channel Control Object instance having a higher priority designation will take priority over another transfer involving a Data/File Control Object instance having a lower priority designation, when insufficient bandwidth is available to accommodate both transfers without discriminating one over the other. A data transfer involving a Data File Channel Object instance having a High setting will also be favored to the extent even if it means loss of real time A/V signals. Overwrite 98b may be set to True or False, denoting whether a file transfer should overlay an existing file on the remote computer 12* with the same filename. ReceiveFileName 98d is used to denote the destination file of a file transfer, whereas SendFileName 98e is used to denote the source file of a file transfer.

Lastly, Status 92c and 98f may be set to the current status of the data and file channels respectively, i.e. Closed if the data/file channel is closed, Ready if the data/file channel is open and ready for data/file transfer, Sending if outbound data/file transfer is in progress, and Receiving if inbound data/file transfer is in progress.

We now refer to FIGS. 12 and 13, wherein the custom events and custom functions of control objects 64–72 are listed. As listed in FIG. 12, connect control object 64 has a Connect, a Connect Failure, a Connect Progress, a Connect Request and a Disconnect custom event. Similarly, Local and Remote A/V Control Objects 66 and 68 also have a Connect and a Disconnect custom event. Additionally, Local/Remote A/V Control Object 66/68 also includes a ZoomChanged event.

Connect is used to notify a local DVC application 42 that connection to a remote DVC application 42 has been achieved, whereas Disconnect is used to notify a local DVC application 42 the opposite, i.e. connection to a remote DVC application 42 has been severed. Connect Request is used to notify a local DVC application 42 that connection request is being made by a remote DVC application 42, whereas Connect Progress is used to notify a local DVC application 42 that connection to a remote DVC application 42 is in progress. Connect Failure is used to notify a local DVC application 42 that connection attempt to a remote DVC application 42 has failed. Finally, ZoomChanged is used to notify the DVC applications 42 of zoom changes to the local/remote A/V capturing.

As listed also in FIG. 12, both Data and File Channel Control Objects 70–72 have a Channel Close, a Channel Open, a Done Receiving, a Done Sending, a Receive Progress, a Receive Started, a Send Progress, a Send Started, and a Transfer Aborted custom event. Channel Open and Close are used to notify a DVC application 42 of the opening or closing of a data/file channel. Send and Receive Started are used to notify a DVC application 42 of the starting of sending and receiving of data/file. Send and Receive Progress are used to notify a DVC application 42 that sending and receiving of data/file are in progress. Done Receiving and Sending are used to notify a DVC application 42 of the completion of sending and receiving of data/file. Lastly, Transfer Aborted is used to notify a DVC application 42 that the sending and receiving of data/file has been aborted.

The DVC applications 42 provide event procedures for handling these events for the applicable control objects 64–72, upon being notified of the events. The manner in which an event procedure handles an event for a control object 64–72 is application dependent.

As listed in FIG. 13, Data Channel Control Object 70 also includes two custom functions 108, Data Channel Send 108a and Data Channel Receive 108b. The two functions 108 are used by DVC applications 42 to send and receive data. Data Channel Send 108a has a pointer parameter SND_PTR 110a pointing to the start of a source buffer, and a length parameter 11a denoting the size of the data to be sent. Similarly, Data Channel Receive 108b has a pointer parameter REC_PTR 110b pointing to the start of a destination buffer, and a length parameter 110b denoting the size of the data to be received.

Figure 14:
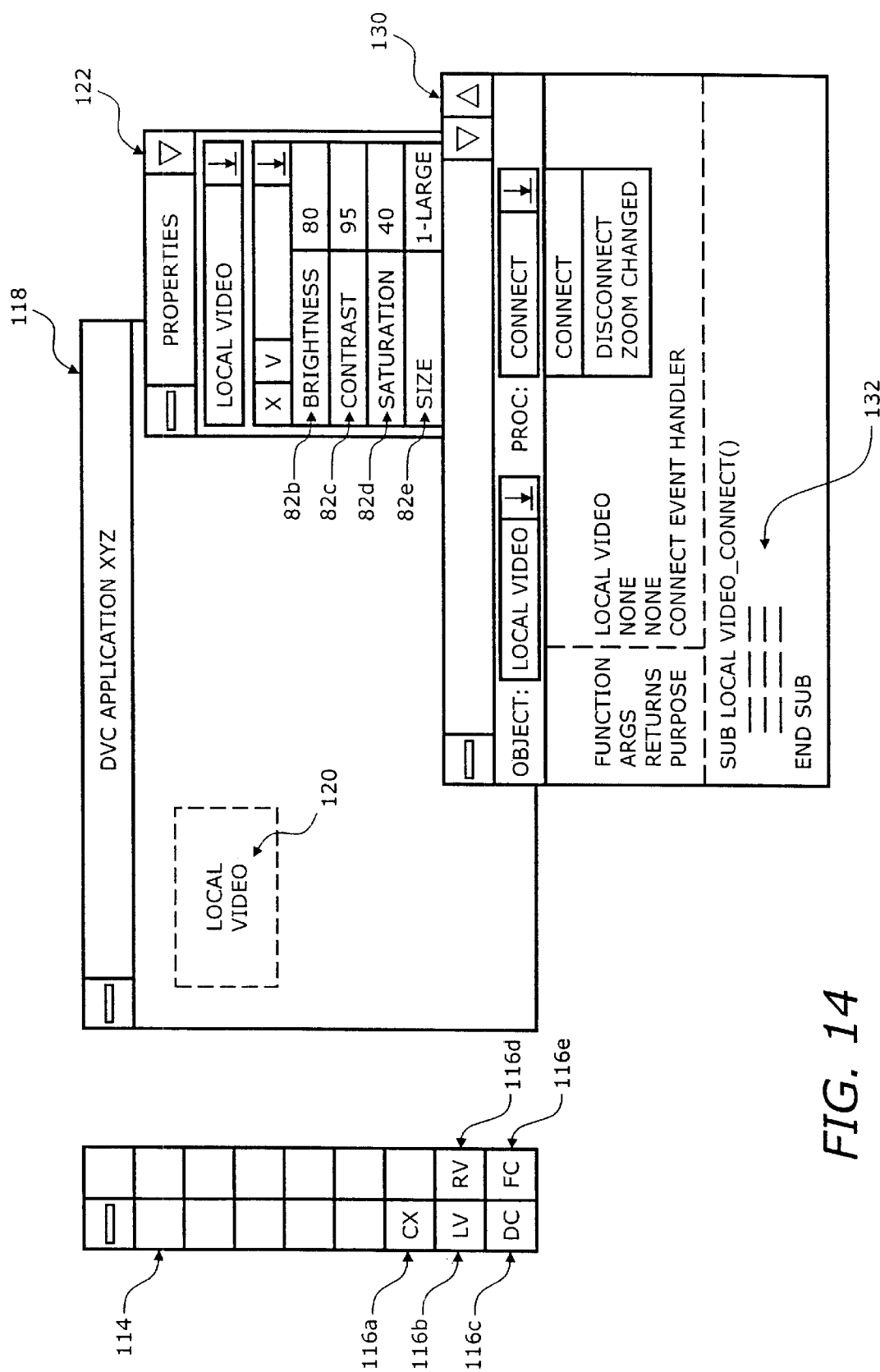
FIG. 14 illustrates the manifestation, instance creation, property value setting, and event procedure provision for one embodiment of the control objects of FIG. 6.

FIG. 14 illustrates the manifestation, instance creation, property setting (at design time), and event procedure provision for Control Objects 64–72 of FIG. 6. As shown, Control Objects 64–72 are manifested as "tools" (CX, LV, RV, DC and FC) 116a–116d in Visual Basic's tool palette 114. Instance creation, property setting (at design time), and event procedure provision for Control Objects 64–72 are all performed in identical manner as standard Visual Basic objects. Thus, these aspects of Control Objects 64–72 are only briefly illustrated here.

As shown, a local video window 120 controlled by an instance of Local A/V Control Object 66 is created by dragging LV 116b to the desired area of the design form 118 for DVC application XYZ 42. The properties for this instance of Local A/V Control Object 66 is set through Property window 122, whereas the event handling procedure for the Connect event is entered through Event Procedure window 130. For further description, refer to Visual Basic's product literature's.

Figure 15:
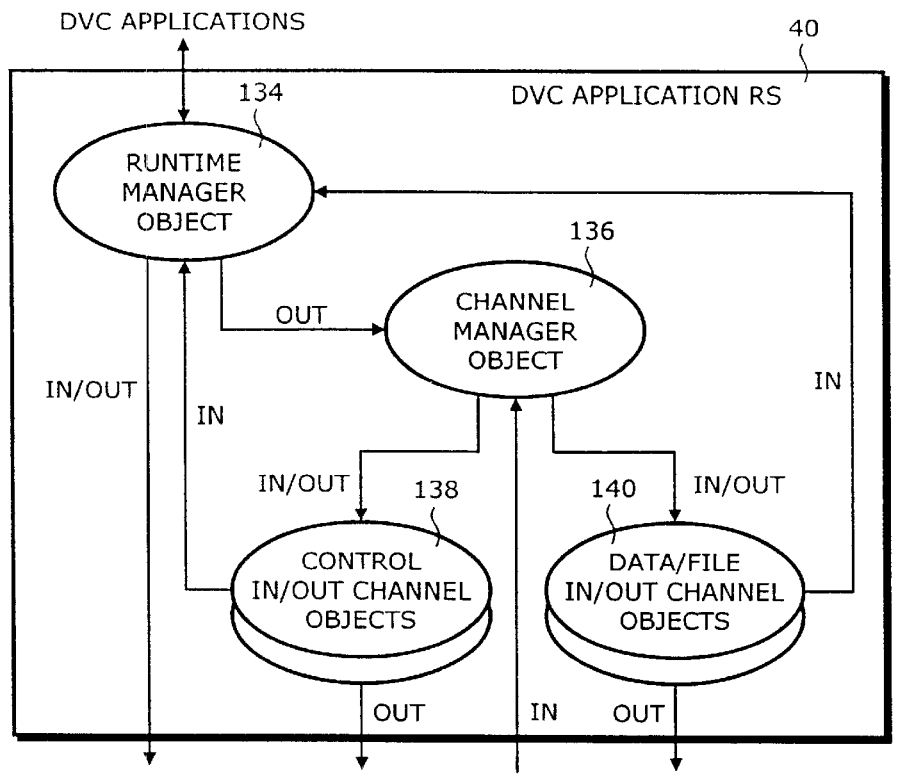
FIG. 15 illustrates the DVC application runtime interface of FIG. 6 in further detail.

We now proceed to describe DVC application RS 40b in further detail, with references to FIGS. 15–17. Referring first to FIG. 15, wherein the presently preferred embodiment is illustrated. As shown, under the presently preferred embodiment, DVC application RS 40b is object-oriented. DVC application RS 40b includes a Runtime Manager Object 134, a Channel Manager Object 136, a pair of Control Input and Output Channel Objects 138, zero or more pairs of Data Input and Output Channel Objects 140, and zero or more pairs of File Input and Output Channel Objects 141. In other words, the various runtime data, i.e. DVC application capabilities, data and file blocks being transferred etc., are "encapsulated", and the object users, i.e. instances of control objects 64–72 manipulate the runtime data by invoking the associated methods, as is known in the art of object-oriented programming.

Runtime Manager Object 134 and Channel Manager Object 136 are created at installation time, whereas Control Input and Output Channel Objects 138 is created at connect time, and Data as well a File Input and Output Channel Objects 140 and 141 are created on an as needed basis, that is when their corresponding data and file channels of DVC application 42 are open, as will be described in more detail below.

Runtime Manager Object 134 is used by instances of control objects 64–72 to exploit the conference services of local GPPC application 38 to manage its interactions with their counterparts of a remote DVC application 42, including control communications, A/V exchanges, and data/file transfers. More specifically, Runtime Manager Object 134 is used by instances of Local and Remote A/V Control Objects 66–68 to exploit the extended A/V services of local GPPC application 38 to manage capturing of local A/V and local as well as remote rendering of the captured A/V. (Local and Remote A/V Control Objects 66–68 also access the extended A/V services of local GPPC application 38 directly to manage aspects of local rendering of local and remote A/V signals that do not have remote effects, e.g. changing the rendering of remote audio signals from headphone to speakers.) Runtime Manager Object 134 is also used by an instance of Connection Control Object 64 to exploit the connection management functions of local GPPC application 38, through Channel Manager Object 136 and Control Input/Output Channel Objects 138, to manage connection to its counterpart of a remote DVC application 42, including automatic exchange of DVC application capabilities at connect time. Lastly, Runtime Manager Object 134 is used by instances of Data and File Channel Control Objects 70–72 to exploit the data management functions of local GPPC application 38, through Channel Manager Object 136 and Data/File Input/Output Channel Objects 140 and 141, to manage sending and receiving of data and files to their counterparts of a remote DVC application 42.

Channel Manager Object 136 is used by Runtime Manager Object 134 to map its logical control channel to Control Input/Output Channel Objects 138, and its virtual data and file channels to Data/File Input/Output Channel Objects 140. In turn, Control Input/Output Channel Objects 138 are used by Channel Manager Object 136 to send and receive control messages for Runtime Manager Object 134, whereas Data/File Input/Output Channel Objects 140 and 141 are used by Channel Manager Object 136 to send and receive data/files for Runtime Manager Object 134. Input Channel Objects, Control as well as Data/File, 138 and 140 and 141, are used to forward control messages and data/file received from the remote DVC application 42 to Runtime Manager Object 134, whereas Output Channel Objects, Control as well as Data/File, 138, 140 and 141, are used to send control messages and data/file blocks received from Runtime Manager Object 134 to the remote DVC application 42.

Figure 16A:
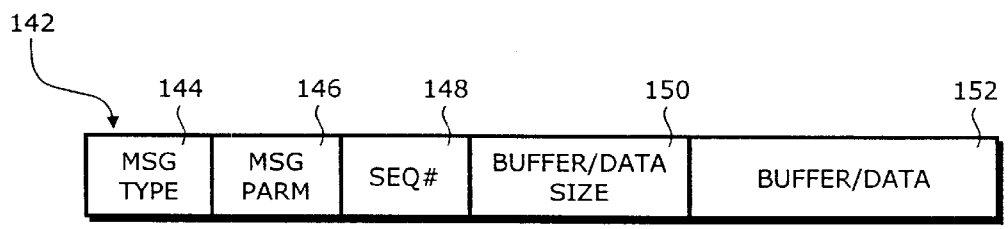
FIGS. 16a–16b illustrate one embodiment of the message format employed by the runtime management objects of FIG. 15.
Figure 16B:
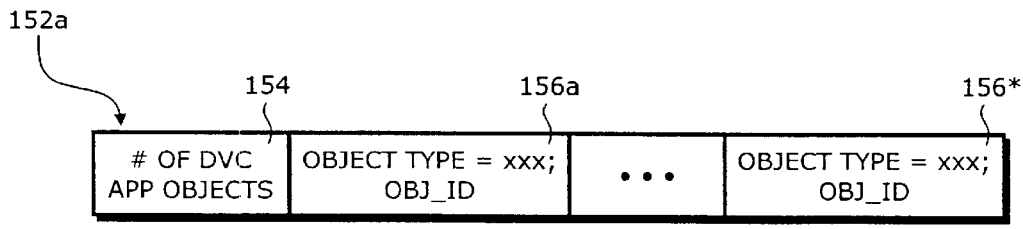

In addition to control messages, both data as well as file blocks are also sent and received as messages. FIG. 16a–16b illustrate one embodiment of the message format employed by the runtime management objects 134–141. As shown in FIG. 16a, under this embodiment, each message 142 comprises a message type 144, i.e. control message or data message etc., message parameters 146, a sequence number 148 (for multi-block data/file transfers), a buffer/data size 150 and the buffer/data itself 152. As shown in FIG. 16b, under this embodiment, the buffer/data 152a of the capability exchange control message comprises the number of DVC application objects incorporated 154, and the object type and object identification 156 of each instance of control object 62–74 incorporated.

FIGS. 17a–17b illustrate one embodiment of various essential control data maintained by Runtime Manager Object 134 and Channel Manager Object 136. As shown in FIG. 17a, under this embodiment, Runtime Manager Object 134 maintains a "table" each on whether the various instances of control object 64–72 are supported by local and remote DVC applications 42, and if supported, their corresponding object identification. As described earlier, these capabilities information of local DVC application 42 are provided automatically to remote DVC application 42 at connect time, and the capabilities information of remote DVC application 42 are received automatically from remote DVC application 42 at connect time. Runtime Manager Object 134 disables those capabilities of a local DVC application 42 that are not supported by the counterpart remote DVC application 42.

For example, if Local A/V Control Object 66 is not supported by remote DVC application 42, Remote A/V Control Object 68 will be marked as unsupported for local DVC application 42. Likewise, if a data channel of local DVC application 42 has no corresponding data channel on remote DVC application 42, it will also be marked as unsupported. The manner in which whether a data/file channel has a corresponding data/file channel will be described in more detail below.

As shown in FIG. 17b, under this embodiment, Channel Manager Object 134 maintains a mapping of the various logical data and file channels of DVC application 42 to the Data and File Input/Output Channel Objects 140 and 141. The Data and File Input/Output Channel Objects 140 and 141 are uniquely identified within a DVC application RS 40b in accordance to a predetermined convention. In one embodiment, they are chronologically identified, for examples, DC0, DC1, FC0, FC1 etc. The data and file channels of DVC application 42 are logically assigned the Data and File Input and Output Channel Objects 140 and 141 at design time. Data/file channels of the local and remote DVC applications are implicitly associated with each other, or corresponding, if they are assigned to Data/File Input and Output Channel Objects 140 and 141 with the same identification.

As accesses for data/file block transfers are routed from the sending DVC application 42 through Runtime Manager Object 134, Channel Manager Object 136 forwards them through the assigned Data/File Input and Output Channel Objects 140 or 141. In like manner, on the receiving end, Channel Manager Object 136 routes the received data/file blocks to receiving DVC application 42 through associated Data/File Channel Input and Output Channels 140 or 141 having the same identification and Runtime Manager Object 134. As a result, data/file transfers between local and remote DVC applications 42 are synchronized to the proper data/file channels.

Figure 18:
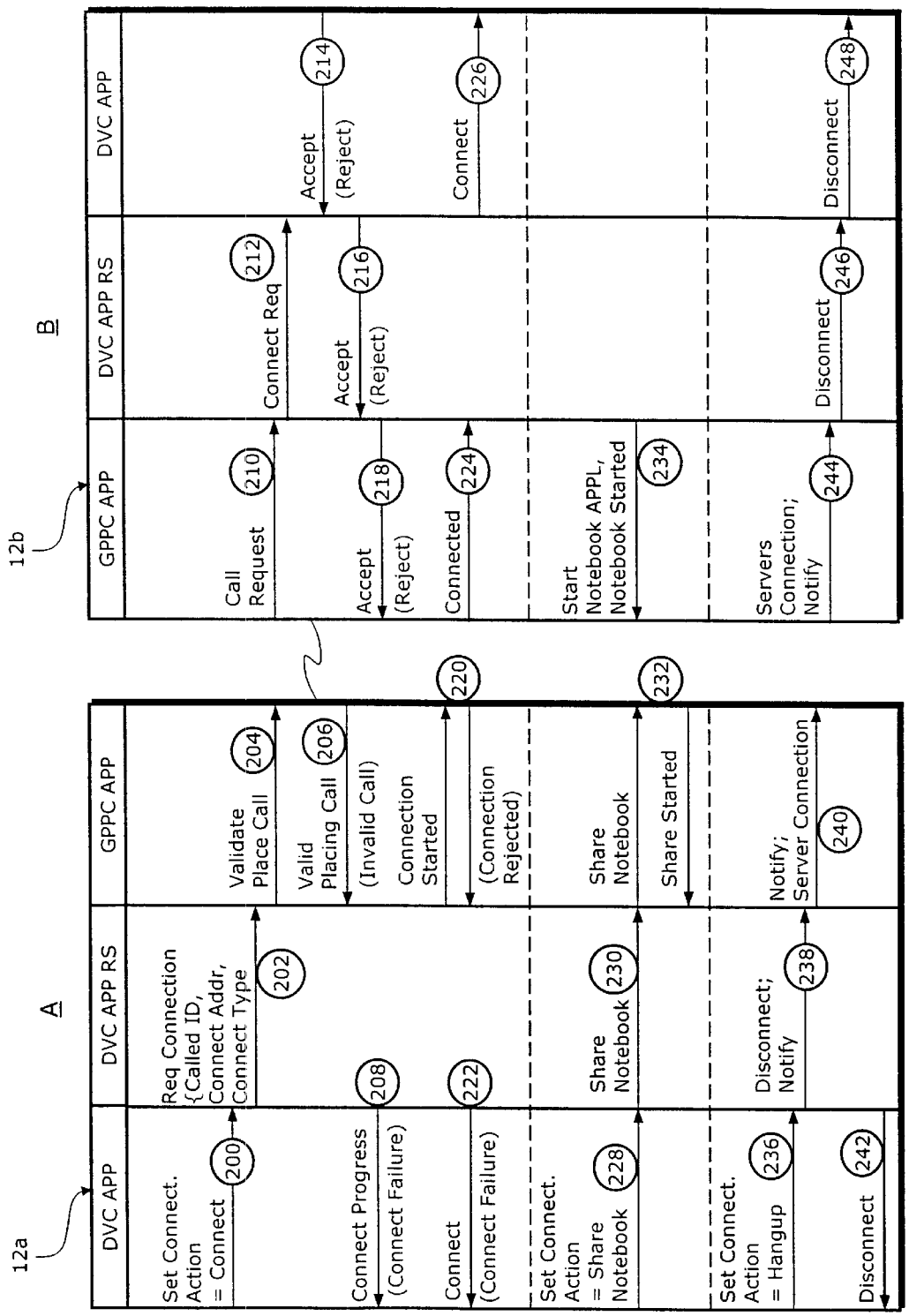
FIGS. 18–21 illustrate the runtime method steps of the present invention.
Figure 19:
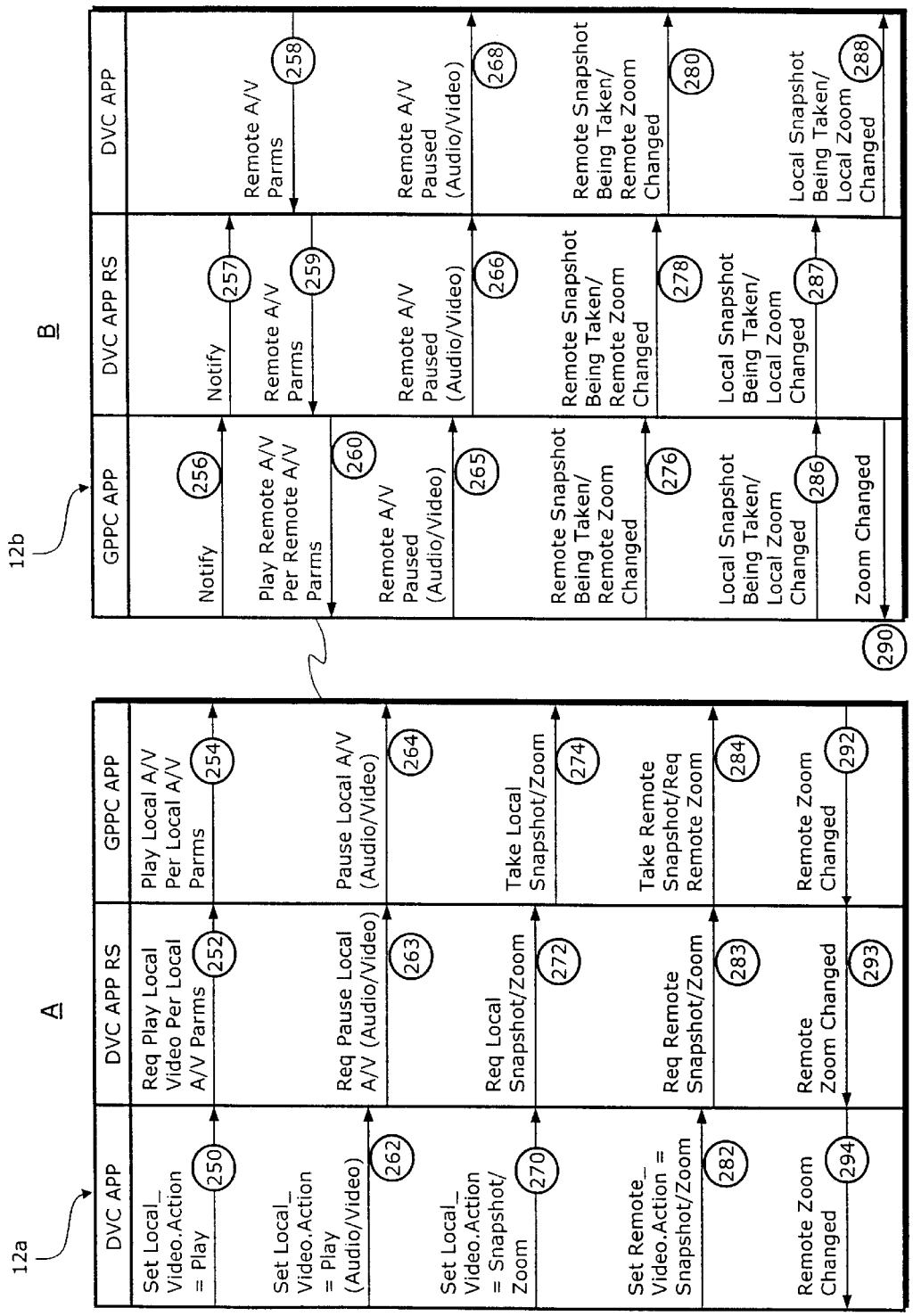
Figure 20:
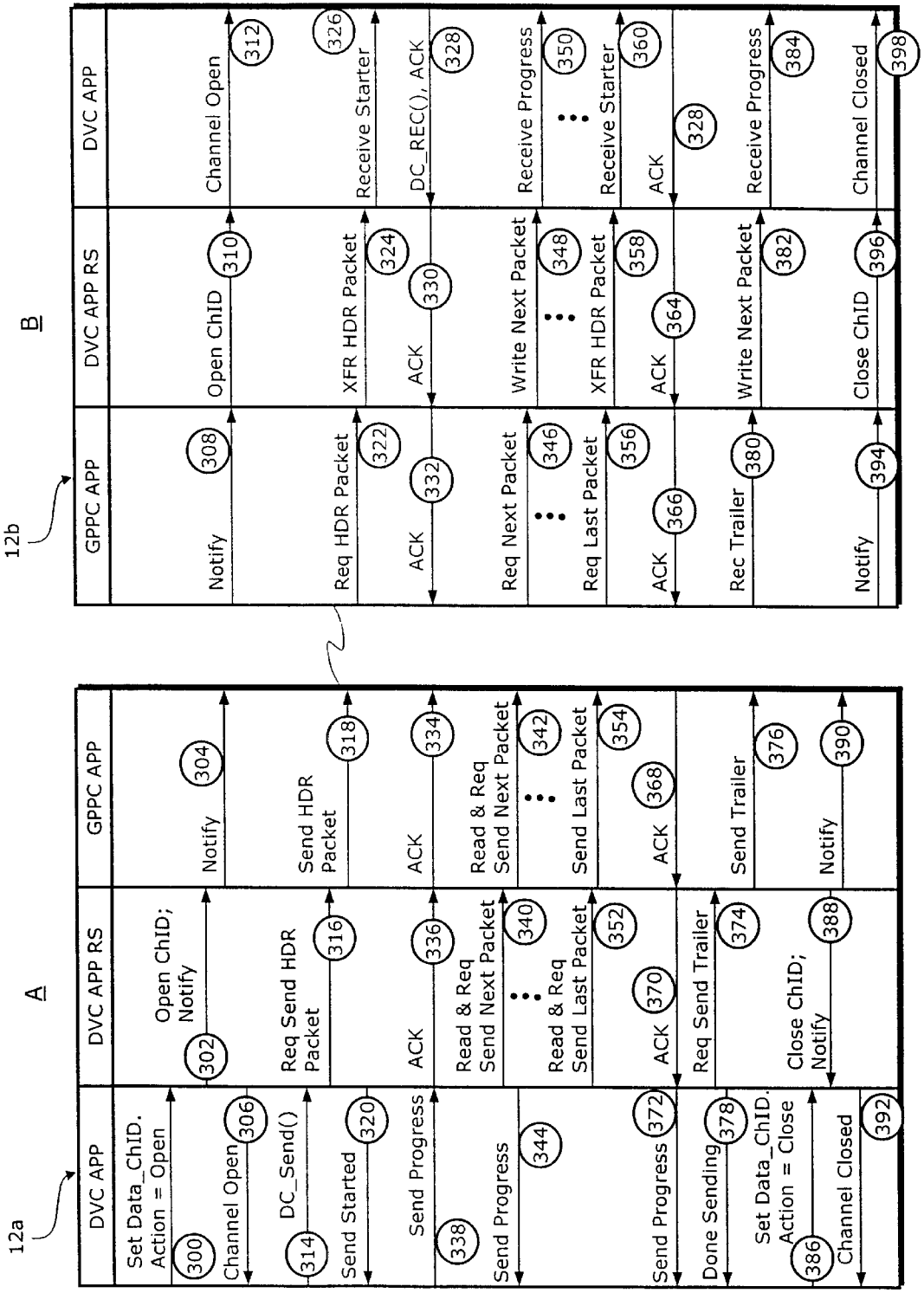

We now proceed to describe the runtime method steps of the present invention in further detail, with references to FIGS. 18–20. For ease of explanation, in the description to follow, all accesses to conferencing services of a GPPC application 38 are assumed to be routed through its TAVSI 50 as described earlier. Similarly, all interactions between a local and a remote DVC application 42 are routed through DVC application RS 40b, with all inbound control messages being routed through Channel Manager Object 136, Control Input Channel Object 138, and Runtime Manager Object 134, all outbound control messages being routed through Runtime Manager Object 134, Channel Manager Object 136, and Control Output Channel Object 138, all inbound data/file blocks being routed through Channel Manager Object 136, Data/File Input Channel Object 140, and Runtime Manager Object 134, and all outbound data/file blocks being routed through Runtime Manager Object 134, Channel Manager Object 136, and Data/File Output Channel Object 140, as described earlier. Furthermore, each reference to a control object 64–72 means a particular DVC application's instance of the control object 64–72. Accordingly, these details will not be repeated below.

Referring first to FIG. 18, as illustrated, DVC application 42 on Computer A 12a makes a connection with DVC application 42 on Computer B 12b by setting Action 74a of Connection Control Object 64 on Computer A 12a to Connect, step 200. In response to the setting, Connection Control Object 64 requests connection management functions of GPPC application 38 through DVC application RS 40b to make the desired connection, steps 200 and 202. Connection Control Object 64 provides the CallerId, ConnectAddress and ConnectType to the connection management functions. In response to the request, the connection management functions validate the request and place the call if the request is a valid request, else reject the request, step 204.

Upon either placing or rejecting the requested call, the connection management functions notify Connection Control Object 64, step 206. In response, Connection Control Object 64 triggers either a Connect Progress or a Connect Failure event, step 208, causing the Connect Progress or Connect Failure event handling procedure of DVC application 38 to be given control to handle the Connect Progress/Connect Failure.

In the meantime, over in Computer B 12b, upon receiving the call (if it was found to be valid and made), connection management functions of GPPC application 38 notify Connection Control Object 64 of DVC application 42, through DVC application RS 40b, steps 210 and 212. Connection Control Object 64 then triggers Connect Request event, step 214. As a result, Connect Request event handling procedure of DVC application 42 is given control. The call is either accepted or rejected by the Connect Request event handling procedure, step 214. The event handling procedure may accept or reject the call in a number of application dependent manner, including but not limited to validating the Caller against a list of "approved" callers.

Upon being notified accordingly by Connection Control Object 64, DVC application RS 40b passes the acceptance/rejection to the connection management functions, step 216, which in turn transmits the acceptance/rejection back to Computer A 12a, step 218.

Back over on Computer A 12a, if the call was accepted, connection management functions of GPPC application 38 either confirm the acceptance with Connection Control Object 64 of DVC application 42 and acknowledge receipt of the acceptance from Computer B 12b, or notify Connection Control Object 64 of the rejection, step 220. In response, Connection Control Object 64 triggers either a Connect or a Connect Failure event accordingly, step 222, causing the Connect or Connect Failure event handling procedure of DVC application 42 to be given control to handle the Connect/Connect Failure.

Over on Computer B 12b, in response to the acknowledgment, connection management functions of GPPC application 38 notify Connection Control Object 64 of DVC application 42 of the acknowledgment, step 224. In response, Connection Control Object 64 triggers a Connect event, step 226, causing the Connect event handling procedure of DVC application 42 to be given control to handle the Connect.

Similarly, DVC application 42 on Computer A 12a causes the conference notebook of GPPC application 38 on Computer A 12a to be shared with GPPC application 38 on Computer B 12b by setting Action 74a of Connection Control Object 64 of DVC application 42 to ShareNotebook, step 228. In response, Connection Control Object 64 requests conference management functions of GPPC application 38 to share its notebook through DVC application RS 40b, steps 228 and 230. In response, the conference management functions send a message to Computer B 12b requesting GPPC application 38 therein to start its Notebook application, step 232. At the same time, the conference management functions notify Connection Control Object 64 sharing of notebook has started, step 232.

Over on Computer B 12b, upon receipt of the request, conference management functions of GPPC application 38 therein start the Notebook application as requested, and notify Computer A 12a accordingly, step 234.

Likewise, DVC application 42 on Computer A 12a causes its connection with DVC application 42 on Computer B 12b to be disconnected by setting Action 74a of Connection Control Object 64 of DVC application 42 to HangUp, step 236. In response, Connection Control Object 64 requests connection management functions of GPPC application 38 to disconnect the connection through DVC application RS 40b, steps 236 and 238. In response, the connection management functions send a message to Computer B 12b notifying GPPC application 38 of the severing of the connection, and then sever the connection, step 240. In the meantime, Connection Control Object 64 also triggers a Disconnect event, step 242, causing the Disconnect event handling procedure of DVC application 42 to be given control to handle the disconnect.

Over on Computer B 12b, upon receipt of the notification, connection management functions of GPPC application 38 therein sever the connection and notify Connection Management Object 64 of DVC application 42, through DVC application RS 40b, steps 244 and 246. In response, Connection Management Object 64 triggers a Disconnect event, step 248, causing Disconnect event handling procedure of DVC application 42 to be given control to handle the disconnect.

Referring now to FIG. 19, DVC application 42 on Computer A 12a starts local A/V capturing, local rendering of the captured A/V, and provision of the captured A/V to remote DVC application 42 by setting Action 82a of Local A/V Control Object 66 of DVC application 42 on Computer A 12a to Play, step 250. In response to the setting, Local A/V Control Object 66 requests A/V services 54 of GPPC application 38 to capture local A/V, locally render the captured A/V, and provide the captured A/V to remote DVC application 42, through DVC application RS 40b, steps 250 and 252. Local A/V Control Object 66 also provides the A/V parameters, i.e. Brightness etc. to A/V services 54. In response to the requests, A/V services 54 capture local A/V, locally render and remotely provide the captured A/V accordingly, step 254.

Over on Computer B 12b, upon first receipt of the remote A/V signals, A/V services 54 of GPPC application 38 notify Remote Video Control Object 68 of DVC application 42, through DVC application RS 40b, steps 256 and 257. In response, Remote Video Control Object 68 provides the remote A/V parameters to A/V services 54 through DVC application RS 40b, steps 258 and 259. A/V services 54 then locally render the remote A/V signals per remote A/V parameters provided, step 260.

Similarly, DVC application 42 on Computer A 12a pauses local A/V rendering (audio and/or video) by setting Action 82a of the particular instance of Local A/V Control Object 66 on Computer A 12a to Pause (with or without audio/video qualification), step 262. In response to the setting, Local A/V Control Object 66 requests A/V services 54 of GPPC application 38 to pause capturing of local audio and/or video, as well as rendering and providing of the captured A/V, through DVC application RS 40b, steps 262 and 263. Additionally, DVC application RS 40b further requests a pause control message to be sent to remote DVC application 42, step 263. In response to the requests, A/V services 54 pause the capturing, local rendering, and remote providing, as well as forwarding the pause control message accordingly, step 264.

Upon cessation of remote A/V signals and receipt of the pause control message over on Computer B 12*, A/V services 54 of GPPC application 38 pause rendering of remote audio and/or video accordingly, step 265. Furthermore, A/V services 54 forward the pause control message to DVC application's instance of Remote A/V Control Object 68 through DVC application RS 40b, steps 265 and 266, which in turn causes the pause control message to be displayed, step 268.

DVC application 42 on Computer A 12a causes a snapshot of local video to be taken or local video to be zoomed by setting Action 82a of Local A/V Control Object 66 of DVC application 42 on Computer A 12a to Snapshot or Zoom, step 270. In response to the setting, Local A/V Control Object 66 requests A/V services 54 of GPPC application 38, through DVC application RS 40b, to take the snapshot or zoom the local video, steps 270 and 272. Additionally, DVC application RS 40b further requests A/V services 54 to send a "Snapshot being taken" or a "Zoom Changed" control message to remote DVC application 42, step 272. In response to the requests, A/V services 54 take the snapshot or zoom the local video, as well as forwarding the control message accordingly, step 274.

Upon receipt of the "snapshot in progress" or "zoom changed" control message, A/V services 54 of GPPC application 38 forward the control message to Remote A/V Control Object 68 of DVC application 42, through DVC application RS 40b, steps 276 and 278. In response, Remote A/V Control Object 68 displays the "snapshot in progress" control message or triggers the ZoomChanged event, causing the ZoomChanged event handling procedure of DVC application 42 to be given control to handle the event, step 280.

In like manner, DVC application 42 on Computer A 12a causes a snapshot of remote video to be taken or remote video to be zoomed by setting Action 86a of Remote A/V Control Object 68 of DVC application 42 on Computer A 12a to Snapshot or Zoom, step 282. In response to the setting, Remote A/V Control Object 68 requests A/V services 54 of GPPC application's 38, through DVC application RS 40b, to take the snapshot or zoom the remote video, steps 282 and 283. Additionally, for a snapshot request, DVC application RS 40bfurther requests A/V services 54 to send a "Snapshot being taken" control message to remote DVC application 42, step 283. In response to the requests, A/V services 54 take the snapshot or request zooming the remote video, as well as forwarding the control message accordingly, step 284.

Upon receipt of the "snapshot in progress" control message or zoom change request, A/V services 54 of GPPC application 38 forward the "snapshot in progress" or a "zoom changed" control message to Local A/V Control Object 66 of DVC application 42, through DVC application RS 40b, steps 286 and 287. For the zoom change request, A/V services 54 also change zooming of the local video accordingly, step 287. In response, Local A/V Control Object 68 displays the "snapshot in progress" control message or triggers the ZoomChanged event, causing the ZoomChanged event handling procedure of DVC application 42 to be given control to handle the event, step 288. In the meantime, A/V services 54 returns a zoom changed message to Computer A 12a.

Upon receipt of the zoom changed message on Computer A 12a, A/V services 54 of GPPC application 38 forwards the message to Remote A/V Control Object 68, through DVC application RS 40b, steps 292 and 293. In response, Remote A/V Control Object 68 triggers the ZoomChanged event, causing the ZoomChanged event handling procedure of DVC application 42 to be given control to handle the event, step 294.

Referring now to FIG. 20, DVC application 42 on Computer A 12a opens a data channel by setting Action 92a of Data Channel Control Object 70 of DVC application 42 on Computer A 12a to Open, step 300. In response to the setting, Data Channel Control Object 70 requests DVC application RS 40b to open the corresponding logical data channel, step 300. In response, DVC application RS 40b internally binds the logical data channel to one pair of its Data/File Input/Output Channel Objects 140, step 302. Additionally, DVC application RS 40b notifies the remote counterpart of the opening of the logical data channel, through data management functions of GPPC application 38, step 302. In response, data management functions notify the remote counterpart accordingly, step 304. In the meantime, Data Channel Control Object 70 triggers a DataChannelOpen event causing the Data Channel Open event handling procedure of DVC application 42 to be given control to handle the event, step 306.

Over on Computer B 12b*, in response to the notification, data management functions of GPPC application 38 notify DVC application RS 40b, step 308. In response, DVC application RS 40b internally binds the corresponding logical data channel to one pair of its Data/File Input/Output Channel Objects 140, step 310. DVC application RS 40b further notifies Data Channel Control Object 66 of DVC application 38, step 310. In response, Data Channel Control Object 66 triggers a DataChannelOpen event causing the Data Channel Open event handling procedure of DVC application 42 to be given control to handle the event, step 312.

Upon learning that the desired data channel is open, DVC application 42 on Computer A 12a sends data to DVC application 42 on Computer B 12b by calling Data Channel Send Function 108a of Data Channel Control Object 70 on Computer A 12a, providing the pointer and length parameters, step 314. In response to the call, Data Channel Send Function 108a first requests data management functions of GPPC application's 38, through DVC application RS 40b, to send a data header, steps 314 and 316. In response, data management functions send the header packet to Computer B 12b, step 318. In the meantime, Data Channel Control Object 70 triggers a DataSendStart event causing the Data Send Start event handling procedure of DVC application 42 to be given control to handle the event, step 320.

Over on Computer B 12b, in response to the header packet, data management functions of GPPC application 38 notify Data Channel Control Object 70 of DVC application 42, through DVC application RS 40b, steps 322 and 324. In response, Data Channel Control Object 70 triggers a DataReceiveStart event causing the Data Receive Start event handling procedure of DVC application 42 to be given control to handle the event, step 326.

Data Receive Start event handling procedure of DVC application 42 then calls Data Channel Receive Function 108b providing the pointer and length parameters to receive the data being sent, step 328. Data Receive Start event handling procedure of DVC application 42 further causes an acknowledgment to be returned, through DVC application RS 40b and GPPC application 38, steps 328 332.

Back over on Computer A 12a, data management functions of GPPC application 38 forward the acknowledgment to Data Channel Control Object 66 of DVC application 42, through DVC application RS 40b, steps 334 and 336. In response, Data Channel Control Object 66 triggers a DataSendProgress event causing the Data Send Progress event handling procedure of DVC application 42 to be given control to handle the event, step 338.

In the meantime, DVC application RS 40b uses data management functions of GPPC application 38 to send the first data packet to Computer B 12*b, steps 340 and 342. Upon detecting the sending of the first data packet, Data Channel Control Object 70 triggers a DataSendProgress event causing the Data Send Progress event handling procedure of DVC application 42 to be given control to handle the event, step 344**.

Over on Computer B 12*b*, in response to the first data packet, data management functions of GPPC application 38, through DVC application RS 40*b* store the data and notify Data Channel Control Object 70 of DVC application 42, steps 346 and 348. In response, Data Channel Control Object 70 triggers a DataReceiveProgress event causing the Data Receive Progress event handling procedure of DVC application 42 to be given control to handle the event, step 350.

These steps are repeated until eventually, back over on Computer A 12*a*, DVC application RS 40*b*, through data management functions of GPPC application 38, sends the last data packet to Computer B 12*b, steps 352 and 354**.

Over on Computer B 12*b*, in response to the last data packet, data management functions of GPPC application 38, through DVC application RS 40*b* store the data and notify Data Channel Control Object 70, steps 356 and 358. In response, Data Channel Control Object 70 triggers another DataReceiveProgress event causing the Data Receive Progress event handling procedure of DVC application 42 to be given control to handle the event, step 360. Data Receive Progress event handling procedure of DVC application 42 then through DVC application RS 40*b* and management functions of GPPC application 38, returns an acknowledgment to Computer A 12*a*, steps 362–366.

Back over on Computer A 12*a*, data management functions of GPPC application 38 through DVC application RS 40*b* forward the acknowledgment to Data Channel Control Object 66 of DVC application 42, steps 368 and 370. In response, Data Channel Control Object 70 triggers one last DataSendProgress event causing the Data Send Progress event handling procedure of DVC application 42 to be given control one last time to handle the event, step 372.

Next, DVC application RS 40*b*, through data management functions of GPPC application 38, sends a trailer to Computer B 12*b*, steps 374 and 376. In response, Data Channel Control Object 70 of DVC application 42 triggers a DataDoneSending event causing the Data Done Sending event handling procedure of DVC application 42 to be given control to handle the event, step 378.

Over on Computer B 12*b*, in response to the receipt of the trailer, data management functions of GPPC application 38, through DVC application RS 40*b* forward the trailer to the appropriate instance of Data Channel Control Object 70, steps 380 and 382. In response, Data Channel Control Object 70 triggers a DataDoneReceiving event causing the Data Done Receiving event handling procedure of DVC application 42 to be given control to handle the event, step 384.

Lastly, DVC application 42 on Computer A 12*a* closes a data channel by setting Action 92*a* of Data Channel Control Object 70 of DVC application 42 on Computer A 12*a* to Close, step 386. In response to the setting, Data Channel Control Object 70 requests DVC application RS 40*b* to close the corresponding logical data channel, step 386. In response, DVC application RS 40*b* internally deallocates the bound pair of Data/File Input/Output Channel Objects 140, step 388. Additionally, DVC application RS 40*b*, through data management services of GPPC application 38 notifies its remote counterpart of the closing of the logical data channel, steps 388 and 390. In the meantime, Data Channel Control Object 70 triggers a DataChannelClose event causing the Data Channel Close event handling procedure of DVC application 42 to be given control to handle the event, step 392.

Over on Computer B 12*b, in response to the notification, data management functions of GPPC application 38 notify DVC application RS 40***b*, step 394. In response, DVC application RS 40*b* internally severs the corresponding logical data channel from its bound pair of Data/File Input/Output Channels 140, step 396. DVC application RS 40*b* further notifies Data Channel Control Object 66, step 396. In response, Data Channel Control Object 66 triggers a DataChannelOpen event causing the Data Channel Open event handling procedure of DVC application 42 to be given control to handle the event, step 398.

Figure 21:
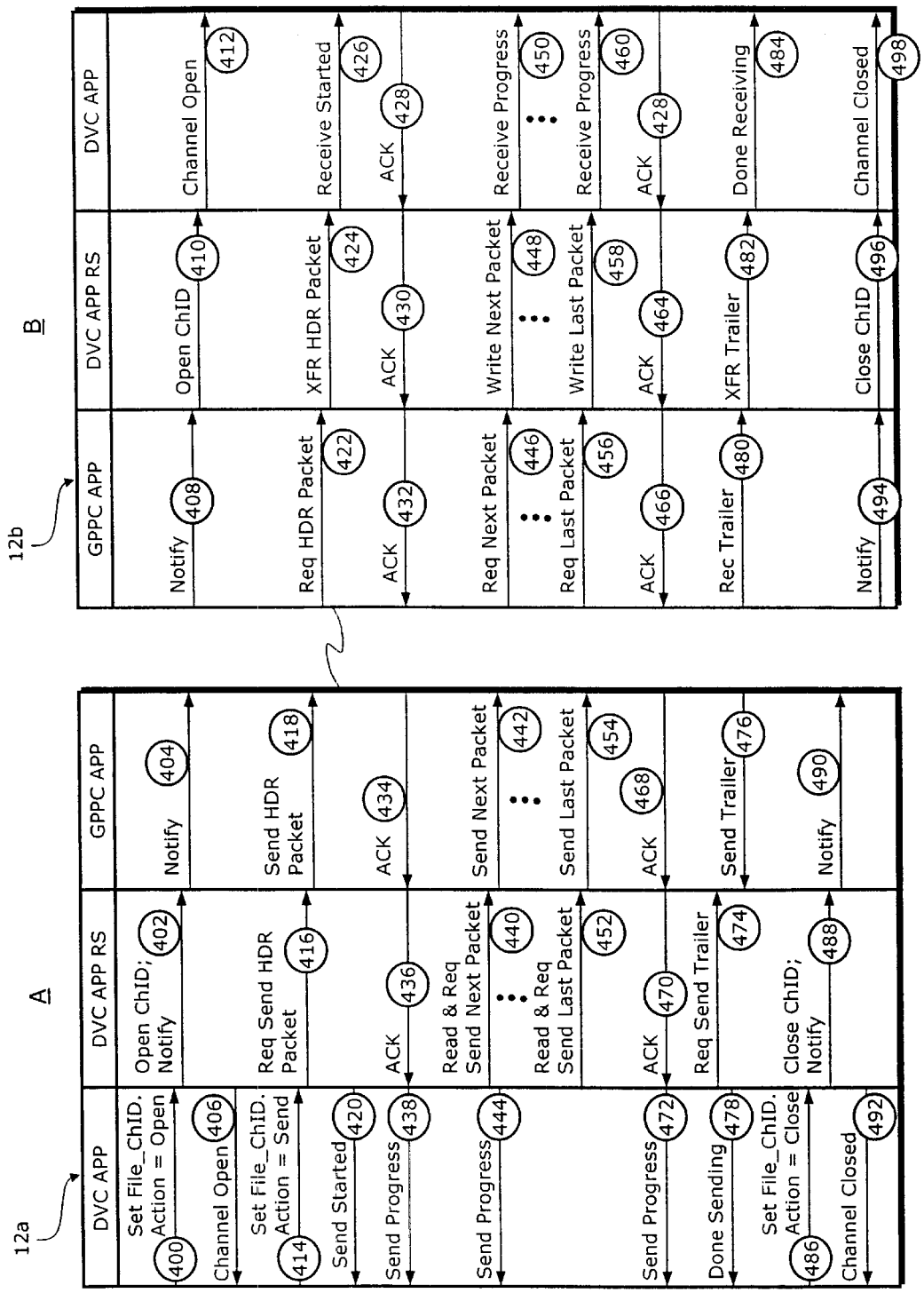

FIG. 21 illustrates the runtime method steps for transferring a file from a local DVC application 42 to a remote DVC application 42. Except for the fact that the transfer is initiated by setting Action 98*a* of File Channel Control Object 72 of DVC application 42 on Computer A 12*a* to Send (as oppose to the employment of Data Send and Data Received Functions), the opening of a file channel, multi-block file transfer, and the closing of a file channel are all performed in similar manners as the opening of a data channel, multi-block data transfer, and the closing of a data channel, described earlier with reference to FIG. 20.

Thus, a method and apparatus for utilizing conferencing services of a GPPC application by a DVC application has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer system having:
   a customized data and/or video conference (DVC) application;
   a general purpose personal conference (GPPC) application; and
   a DVC application runtime synchronizer (RS) interposed between the customized DVC application and the GPPC application, the customized DVC application being incorporated with instances of prepackaged control objects of a prepackaged object-oriented DVC application programming toolkit (PK) to exploit conferencing services of the GPPC application during operation in managing a connected remote customized DVC application that is similarly constituted, and the DVC application RS comprising a plurality of runtime management objects for complementing the incorporated prepackaged control object instances to manage runtime interactions between the customized DVC application and the connected remote customized DVC application, so that the customized DVC application is automatically synchronized to the connected remote customized DVC application to exchange information directly as well as complemented on another computer system.

2. The computer system as set forth in claim 1, wherein the runtime management objects of the DVC application RS includes a runtime manager object for receiving from the incorporated prepackaged control objects all conferencing services accesses having repercussion on the connected remote customized DVC application.

3. The computer system as set forth in claim 2, wherein the runtime manager object comprises logic for augmenting conferencing service accesses for the purpose of local rendering of audio and video with additional conferencing service accesses to send control messages to the connected remote customized DVC application.

4. The computer system as set forth in claim 3, wherein,
the runtime management objects of the DVC application RS further comprises a channel manager object for creating a pair of control input and output channel objects at connect time and for routing control messages to the connected remote customized DVC application through the control input and output channel objects; and the augmentation logic of the runtime manager object routes the additional conferencing service accesses for sending control messages to the connected remote customized DVC application to the channel manager object.

5. The computer system as set forth in claim 2, wherein,
the runtime management objects of the DVC application RS further comprises a channel manager object for creating a pair of data input and output channel objects for an open data channel of the customized DVC application, and for routing data blocks being sent to the connected remote customized DVC application through the data input and output channel objects; and the runtime manager object further comprises logic for routing conferencing service accesses for sending data blocks to the connected remote customized DVC application to the channel manager object.

6. The computer system as set forth in claim 2, wherein,
the runtime management objects of the DVC application RS further comprises a channel manager object for creating a pair of file input and output channel objects for an open file channel of the customized DVC application, and for routing file blocks being sent to the connected remote customized DVC application through the file input and output channel objects; and the runtime manager object further comprises logic for routing conferencing service accesses for sending file blocks to the connected remote customized DVC application to the channel manager object.

7. The computer system as set forth in claim 2, wherein the runtime manager object further comprises logic for exchanging capability information with its counterpart of the connected remote DVC application at connect time, and disabling capabilities of the local DVC application that are not supported by the connected remote DVC application responsive to the capability information exchanged.

8. In a computer system having a customized data and/or video conference (DVC) application and a general purpose personal conference (GPPC) application, wherein the customized DVC application is incorporated with instances of prepackaged control objects of a prepackaged object-oriented DVC application programming toolkit (PK) to exploit conferencing services of the GPPC application during operation in managing a connected remote customized DVC application that is similarly constituted, a method for automatically and directly synchronizing running of the customized DVC application to the connected remote customized DVC application that is complemented on another computer system, the method comprising the step of:

(a) interposing a DVC application runtime synchronizer (RS) having a number of runtime management objects between the customized DVC application and the GPPC application to complement the incorporated prepackaged control object instances, managing runtime interactions between the customized DVC application and the connected remote customized DVC application to exchange information directly, augmenting and/or imposing channel orders on all conferencing service accesses having repercussion on the connected remote customized DVC application.

9. The method as set forth in claim 8, wherein step (a) comprises the step of (a.1) routing all conferencing services accesses having repercussion on the connected remote customized DVC application from the incorporated prepackaged control objects to a runtime manager object.

10. The method as set forth in claim 9, wherein step (a) further comprises the step of (a.2) augmenting conferencing service accesses for the purpose of local rendering of audio and video by the runtime manager object with additional conferencing service accesses to send control messages to the connected remote customized DVC application.

11. The method as set forth in claim 10, wherein step (a) further comprises the steps of:

(a.3) creating a pair of control input and output channel objects at connect time by a channel manager object;

(a.4) routing the additional conferencing service accesses for sending control messages to the connected remote customized DVC application from the runtime manager object to the channel manager object; and (a.5) routing the control messages to the connected remote customized DVC application through the control input and output channel objects by the channel manager object.

12. The method as set forth in claim 9, wherein step (a) further comprises the steps of:

(a.2) creating a pair of data input and output channel objects for an open data channel of the customized DVC application by a channel manager object;

(a.3) routing conferencing service accesses for sending data blocks to the connected remote customized DVC application from the runtime manager object to the channel manager object; and (a.4) routing the data blocks being sent to the connected remote customized DVC application through the data input and output channel objects by the channel manager object.

13. The method as set forth in claim 9, wherein step (a) further comprises the steps of:

(a.2) creating a pair of file input and output channel objects for an open file channel of the customized DVC application by a channel manager object;

(a.3) routing conferencing service accesses for sending file blocks to the connected remote customized DVC application from the runtime manager object to the channel manager object; and (a.4) routing the file blocks being sent to the connected remote customized DVC application through the file input and output channel objects by the channel manager object.

14. The method as set forth in claim 9, wherein step (a) comprises the steps of:

(a.2) exchanging capability information by the runtime manager object with its counterpart of the connected remote DVC application at connect time; and (a.3) disabling capabilities of the local DVC application that are not supported by the connected remote DVC application by the runtime manager object responsive to the capability information exchanged.

15. A network of computer systems comprising:

(a) first computer system having a first customized data and/or video conference (DVC) application, a first general purpose personal conference (GPPC) application and a first DVC application runtime synchronizer (RS) interposed between the first customized DVC application and the first GPPC application, the first customized DVC application being incorporated with first instances of prepackaged control objects of a prepackaged object-oriented DVC application programming toolkit (PK) to exploit conferencing services of the first GPPC application during operation in managing a second customized DVC application, and the first DVC application RS comprising a first plurality of runtime management objects for complementing the first incorporated prepackaged control object instances to manage runtime interactions between the first customized DVC application and the second customized DVC application; and (b) a second computer system having the second customized DVC application, a second GPPC application and a second DVC application RS interposed between the second customized DVC application and the second GPPC application, the second customized DVC application being similarly incorporated with second instances of prepackaged control objects of the prepackaged object-oriented DVC application PK to exploit conferencing services of the second GPPC application during operation in managing the first customized DVC application, and the second DVC application RS also comprising a second plurality of runtime management objects for complementing the second incorporated prepackaged control object instances to manage runtime interactions between the first customized DVC application and the second customized DVC application, the first and second customized DVC applications being automatically synchronized to each other to exchange information directly.

16. In a network of computer systems comprising a first and a second computer system, having a first and a second customized data and/or video conference (DVC) application, and a first and a second general purpose personal conference (GPPC) application, correspondingly disposed on the first and second computer systems, wherein the first and second customized DVC applications are correspondingly incorporated with first and second instances of prepackaged control objects of a prepackaged object-oriented DVC application programming toolkit (PK) to exploit conferencing services of the first and second GPPC application respectively during operation in managing the first and second customized DVC applications, a method for automatically and directly synchronizing running of the first and second DVC applications, the method comprising:

(a) interposing a first DVC application runtime synchronizer (RS) having a first number of runtime management object between the first customized DVC application and the first GPPC application to complement the first incorporated prepackaged control object instances managing runtime interactions between the first and second customized DVC applications, augmenting and/or imposing channel orders on all conferencing service accesses having repercussion on the second customized DVC application; and (b) interposing a second DVC application RS having a second number of runtime management object between the second customized DVC application and the second GPPC application to complement the second incorporated prepackaged control object instances, managing runtime interactions between the first and second customized DVC applications augmenting and/or imposing channel orders on all conferencing service accesses having repercussion on the first customized DVC application, the first and second customized DVC applications being automatically synchronized to each other to exchange information directly.

* * * * *

UNITED STATES PATENT AND TRADEMARK OFFICE
CERTIFICATE OF CORRECTION

PATENT NO.   : 6,502,126 B1
DATED        : December 31, 2002
INVENTOR(S)  : Pendakur It is certified that error appears in the above-identified patent and that said Letters Patent is hereby corrected as shown below:

<u>Column 10,</u>
Line 5, delete "11a" and insert -- 110a --.

Signed and Sealed this

First Day of July, 2003

JAMES E. ROGAN
*Director of the United States Patent and Trademark Office*